United States Patent [19]
Chaparro et al.

[11] 3,899,085
[45] Aug. 12, 1975

[54] INTEGRATED CIRCUIT HANDLING SYSTEM

[75] Inventors: John J. Chaparro; Lowell V. Ellis, both of San Diego; Doyle W. Meanor, Lakeside; William D. Morton, Jr.; Bernd H. Richelmann, both of San Diego; George B. Ross, Mill Valley; John E. Toth, San Diego, all of Calif.

[73] Assignee: Delta Design, Inc., La Mesa, Calif.

[22] Filed: Mar. 2, 1972

[21] Appl. No.: 231,421

Related U.S. Application Data

[62] Division of Ser. No. 44,401, June 8, 1970, Pat. No. 3,677,401.

[52] U.S. Cl. ............ 214/1 BB; 248/313; 324/73 R; 403/329
[51] Int. Cl. .............................................. B23q 7/06
[58] Field of Search ...... 214/1 B, 1 BB, 1 BS, 1 BT; 324/73 AT, 73 R, 158 F; 248/226 B, 313; 285/317; 403/329

[56] References Cited
UNITED STATES PATENTS

| | | | |
|---|---|---|---|
| 951,889 | 3/1910 | Teuer | 285/317 X |
| 2,999,587 | 9/1961 | Campbell | 324/73 AT |
| 3,408,565 | 10/1968 | Frick | 324/158 F |
| 3,560,849 | 2/1971 | Ryan | 324/158 R X |

FOREIGN PATENTS OR APPLICATIONS

| | | | |
|---|---|---|---|
| 1,959,556 | 11/1969 | Germany | 220/9 F |

*Primary Examiner*—Robert J. Spar
*Assistant Examiner*—George F. Abraham

[57] ABSTRACT

A handling system, including an environmental system, for bringing a manufactured I.C. component into contact with a test contactor. Various parts, portions, and subcombinations of the system, including a hand feeder and orientor, an extension feeding conduit with an air pressure or friction wheel drive, a quick connect-disconnect output chute connector, a handling mechanism, a connector to attach a test contactor to a handling mechanism, a five place sorting apparatus, an environmental handling mechanism, and an insulated housing are detailed.

10 Claims, 39 Drawing Figures

PATENTED AUG 12 1975 3,899,085

SHEET 2

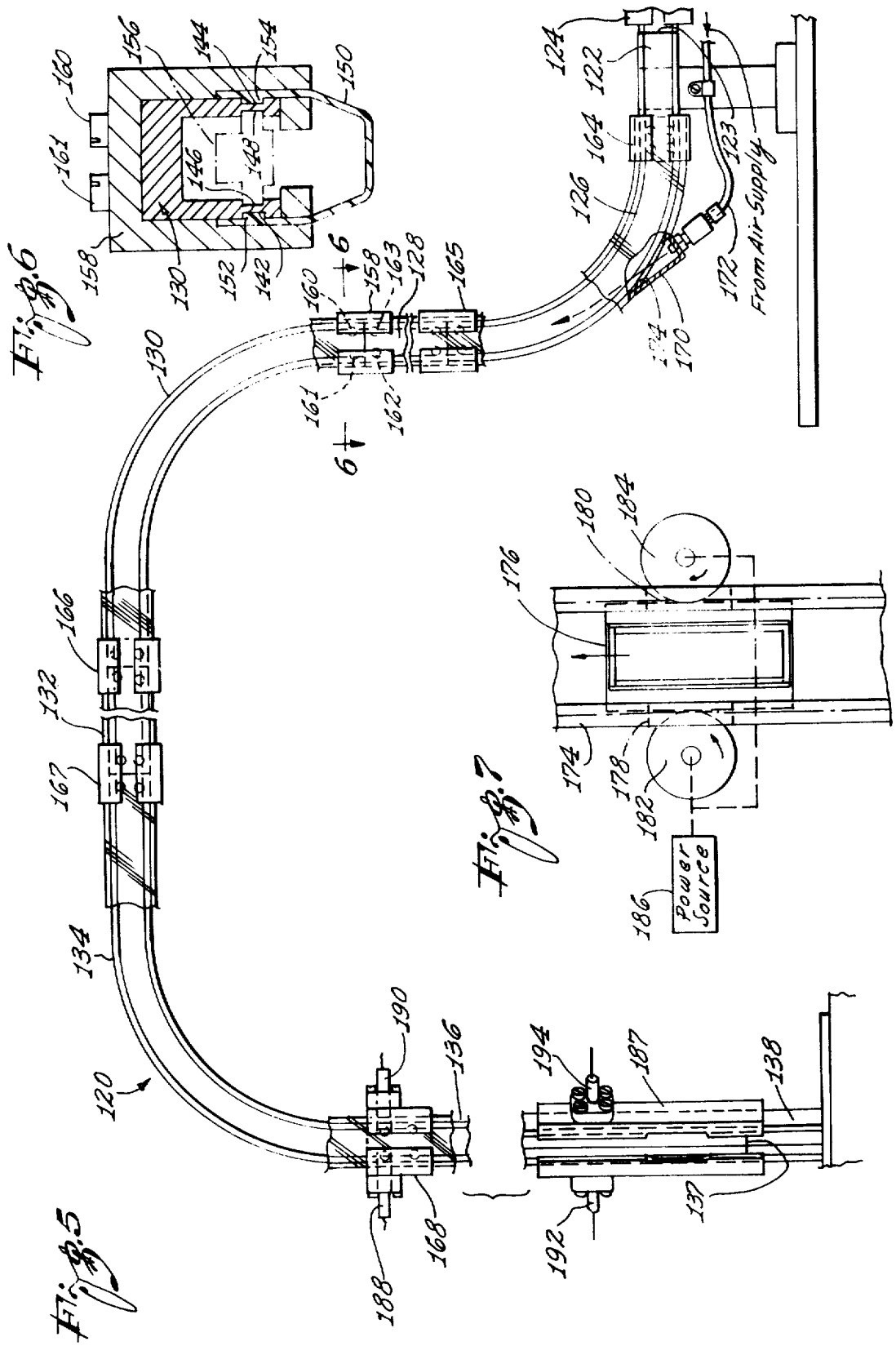

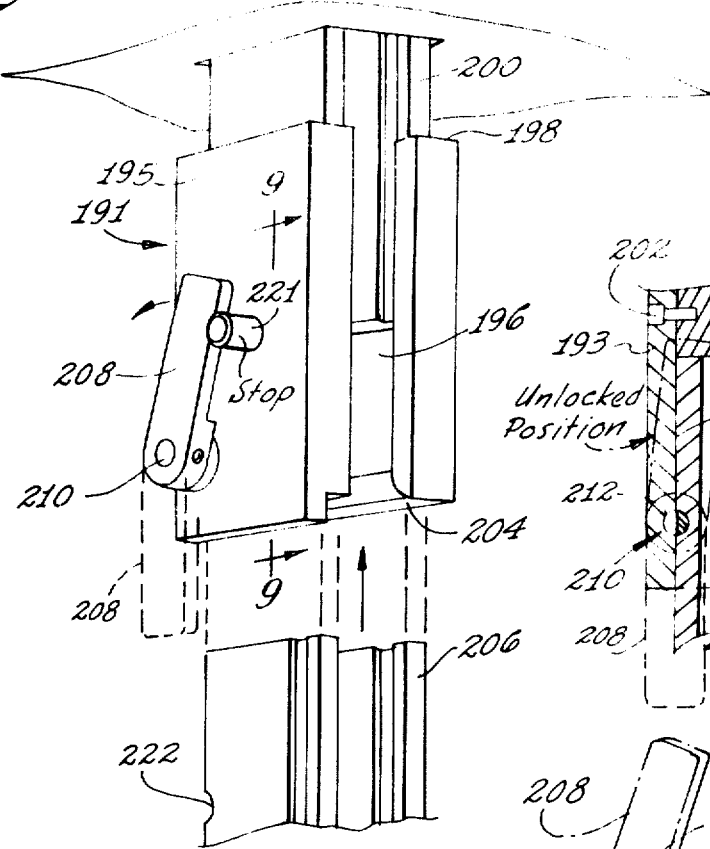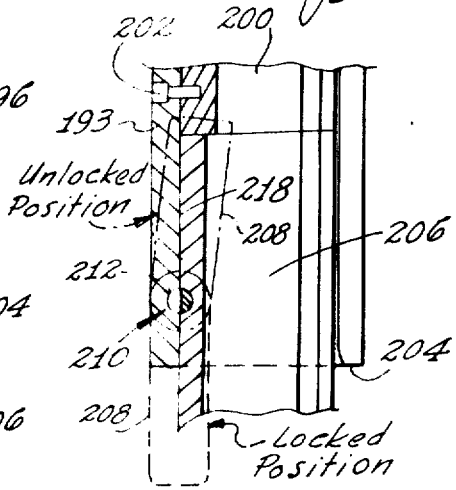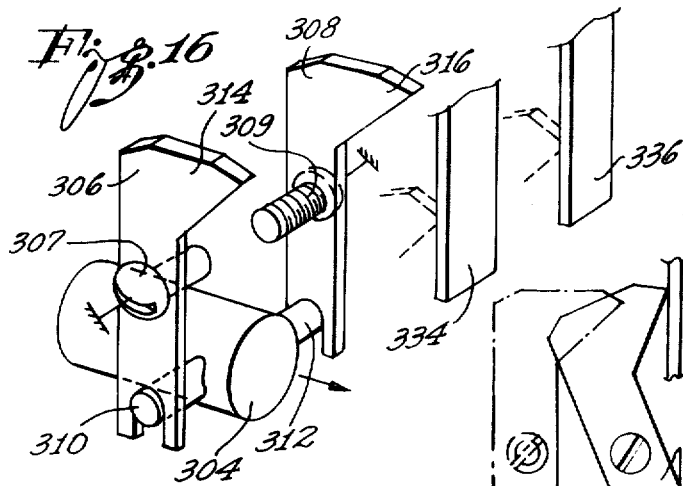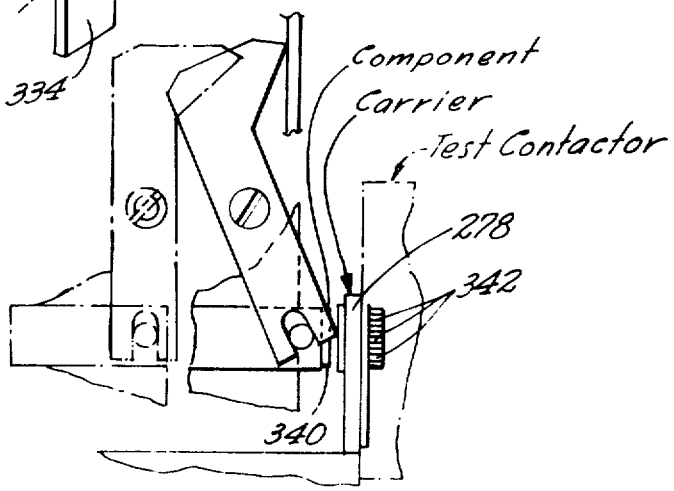

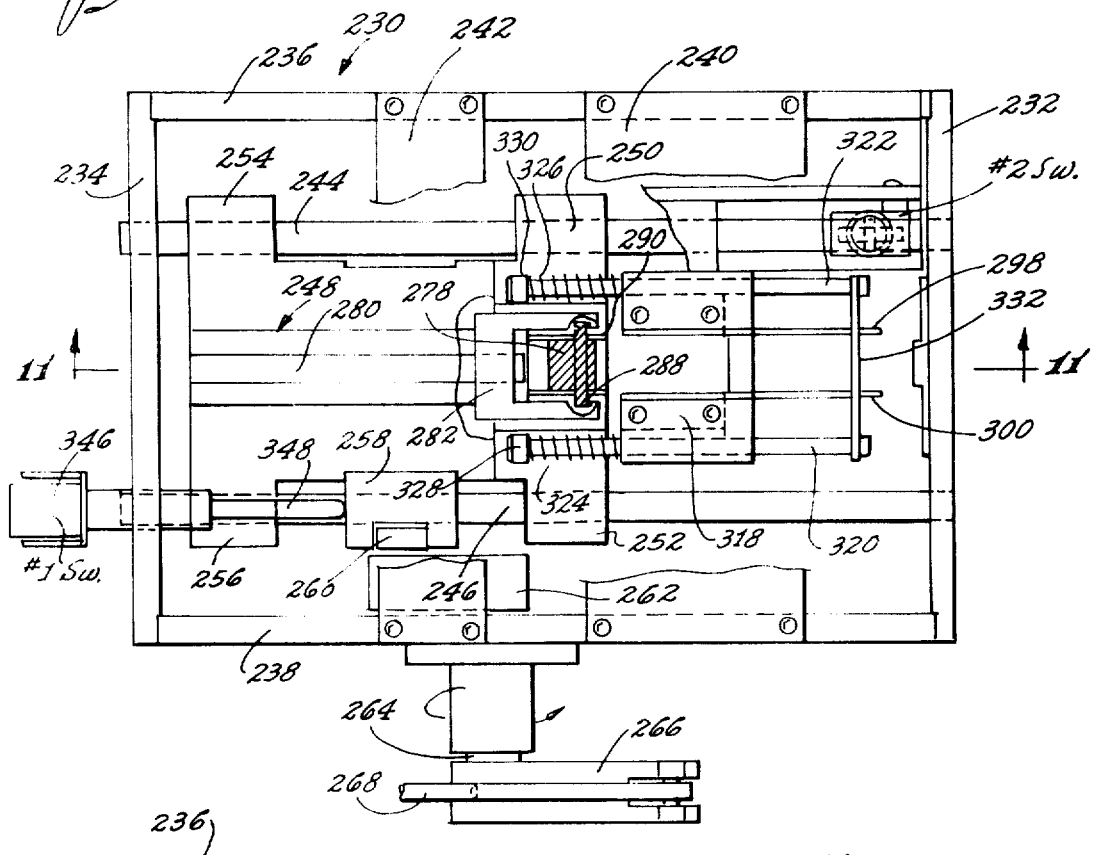
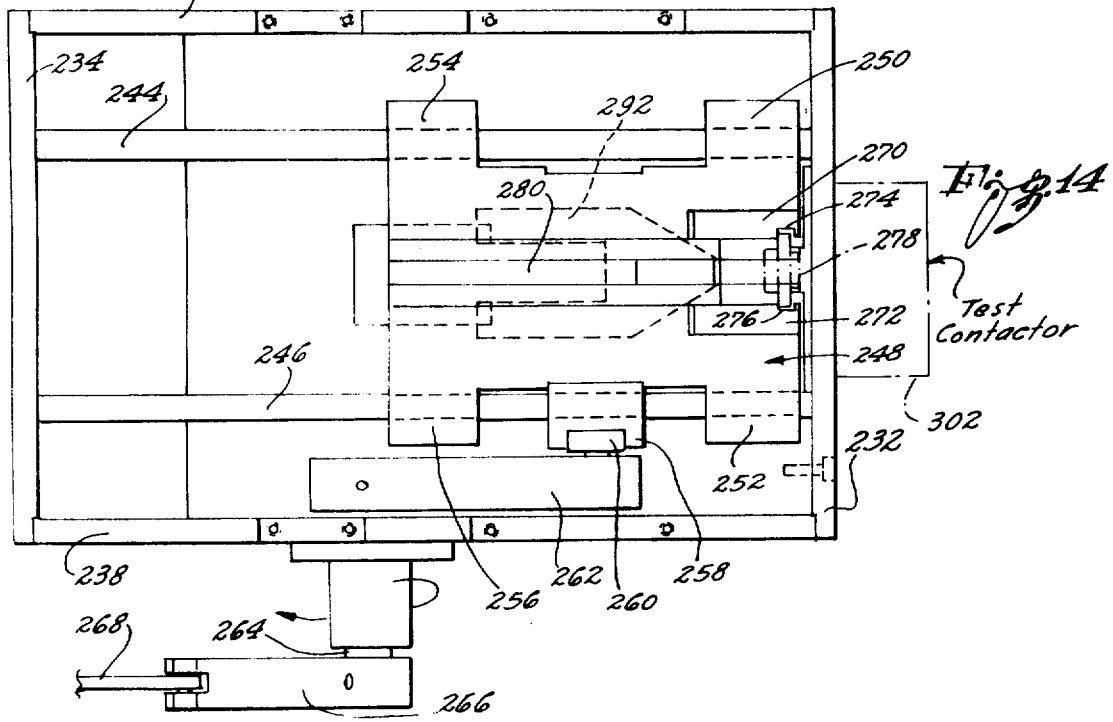

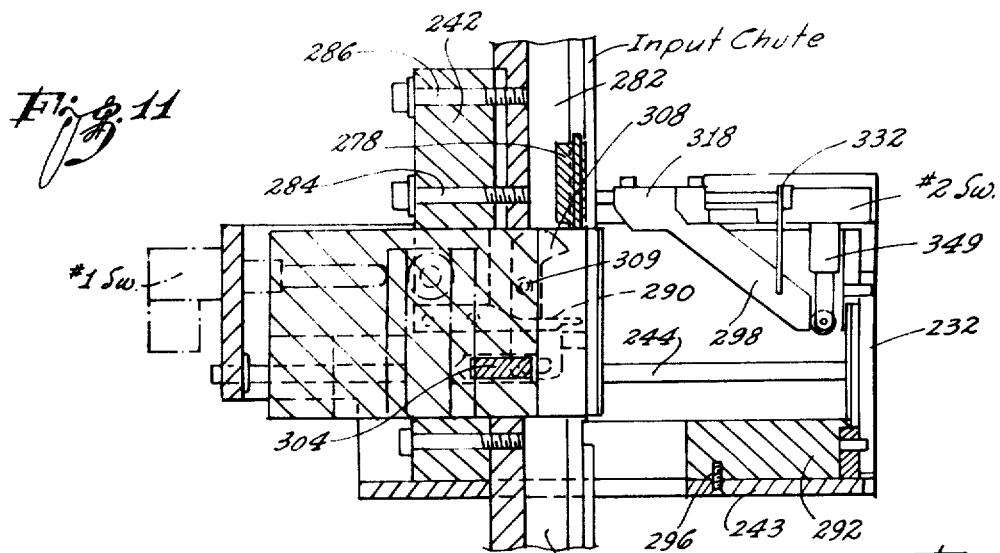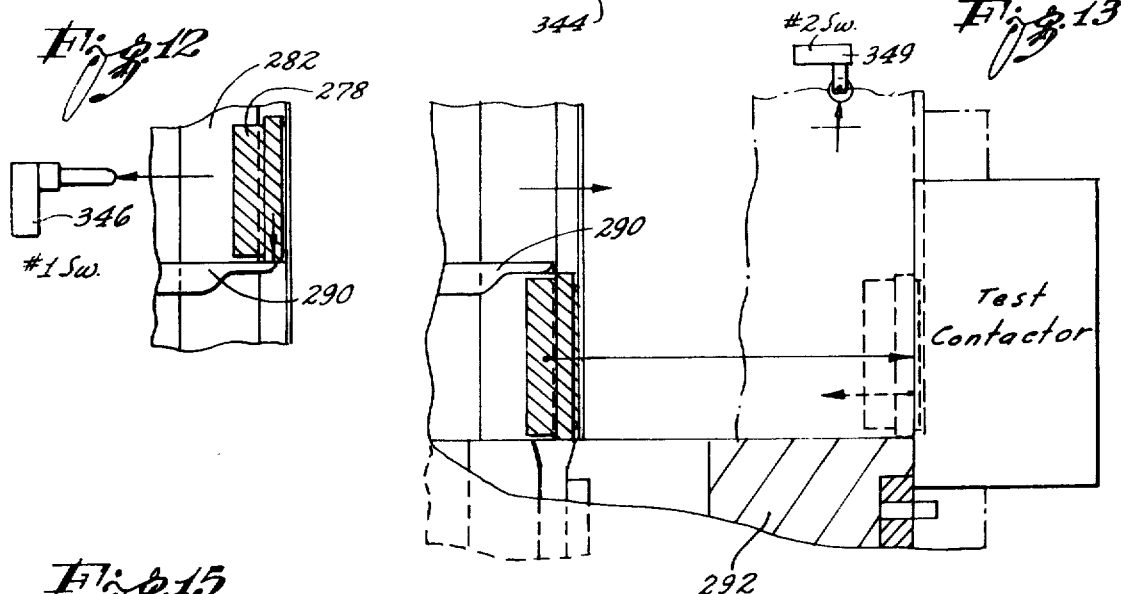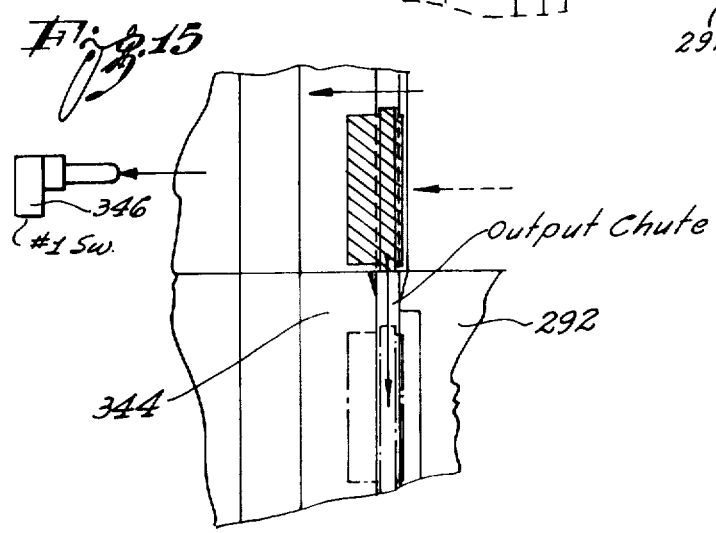

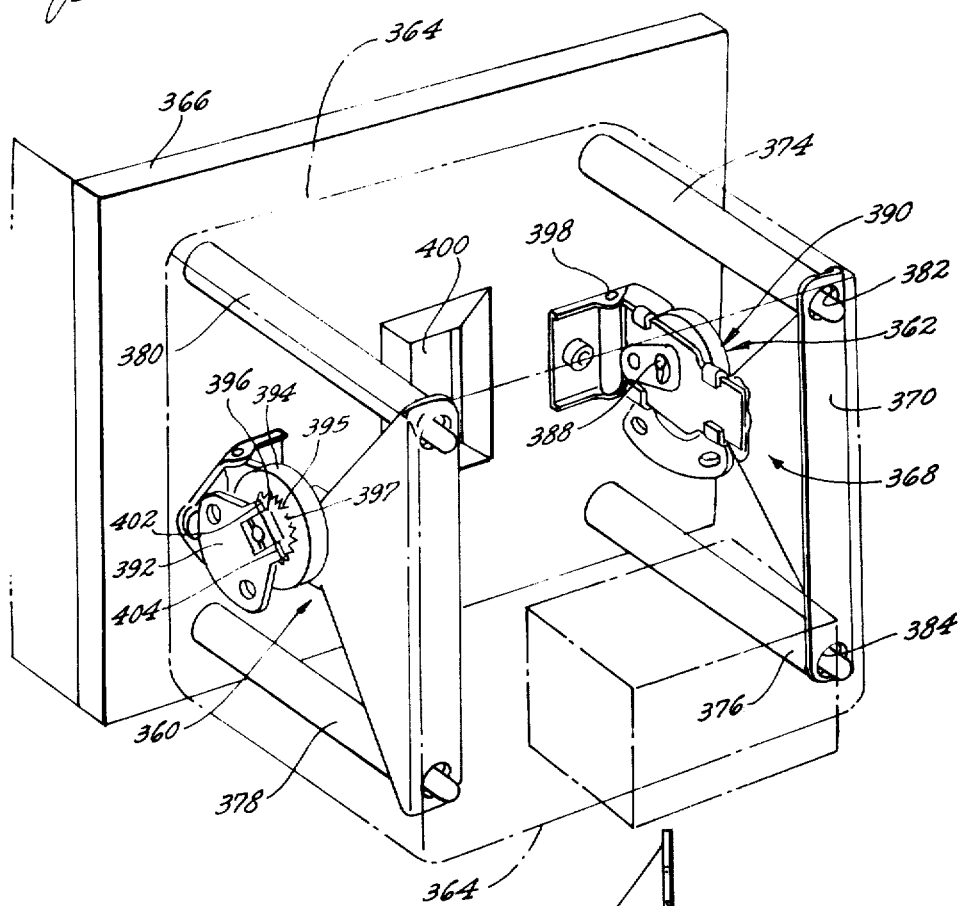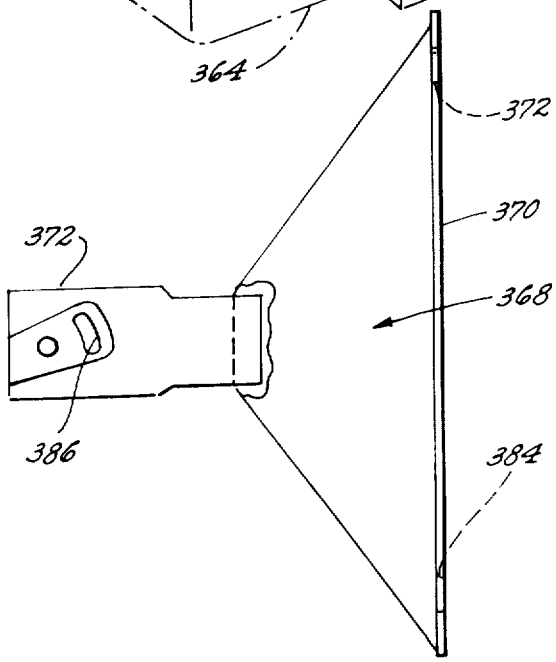

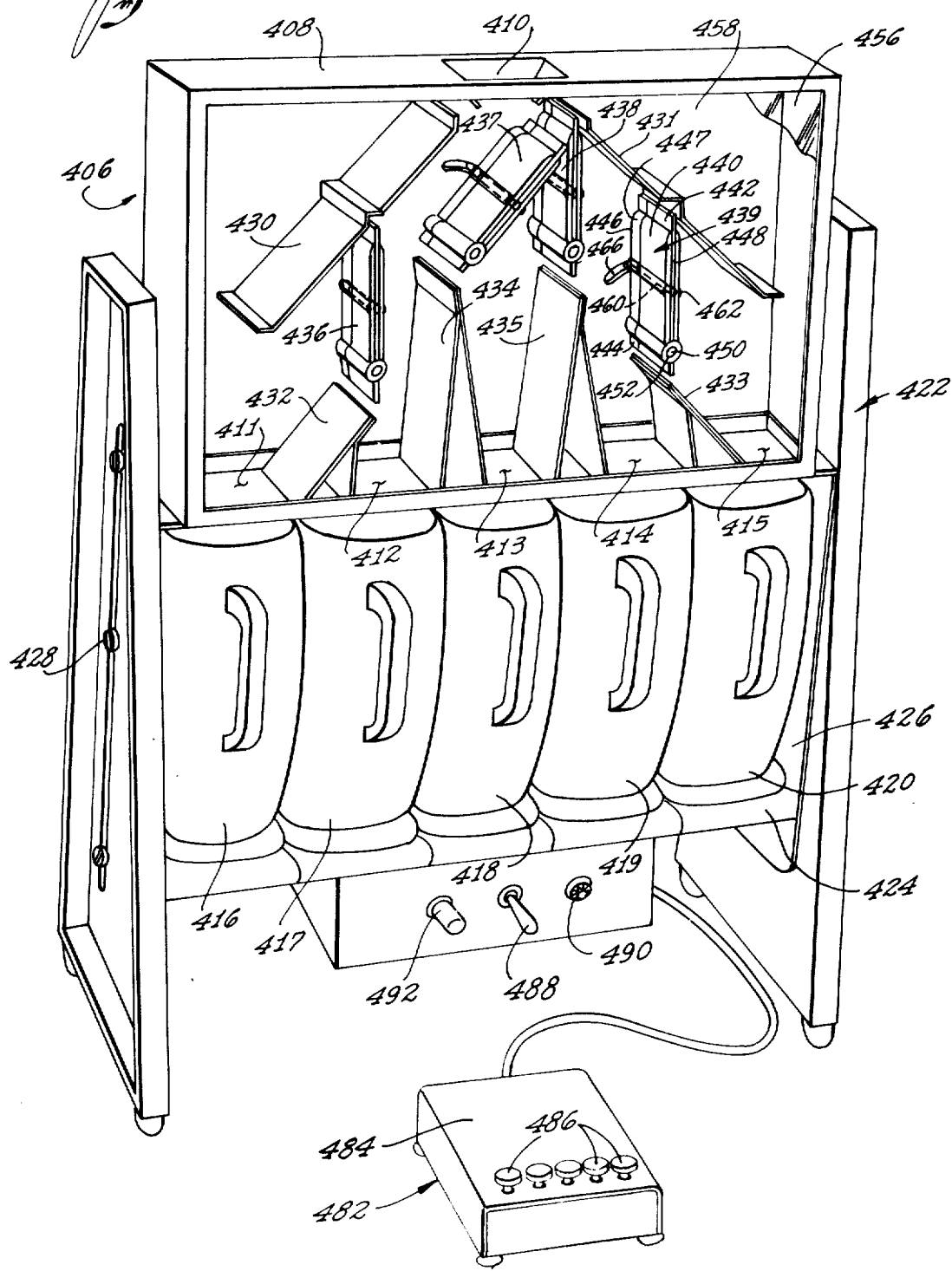

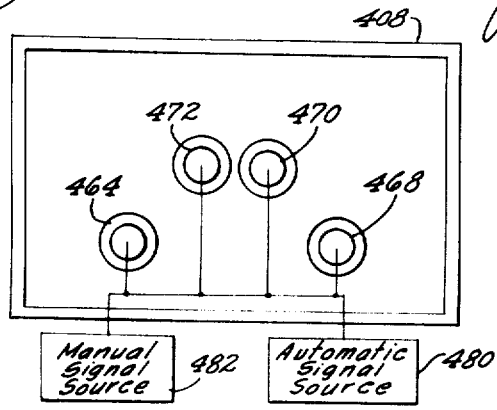
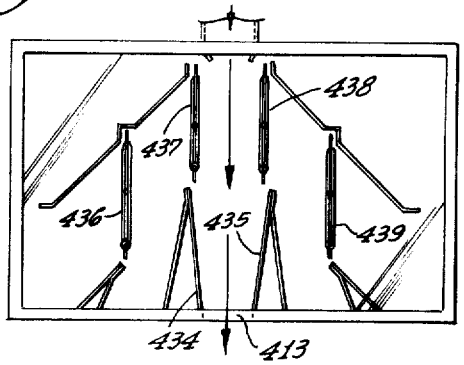
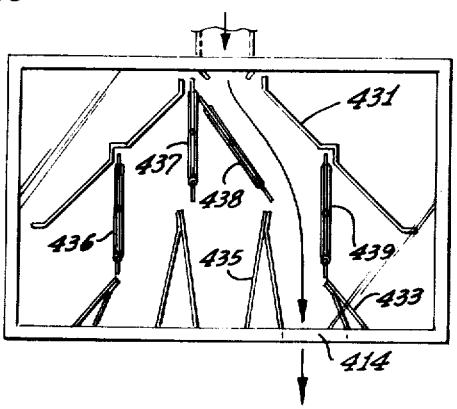
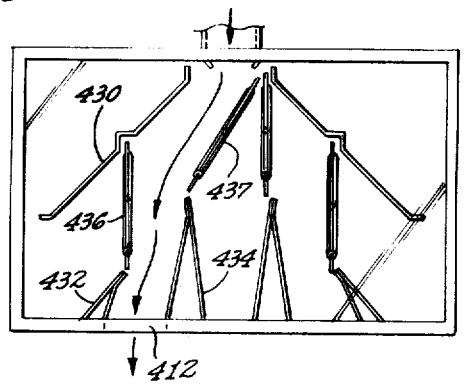
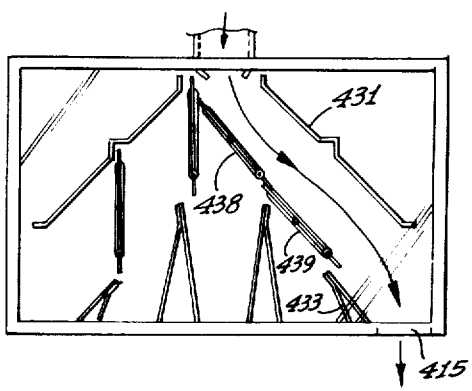
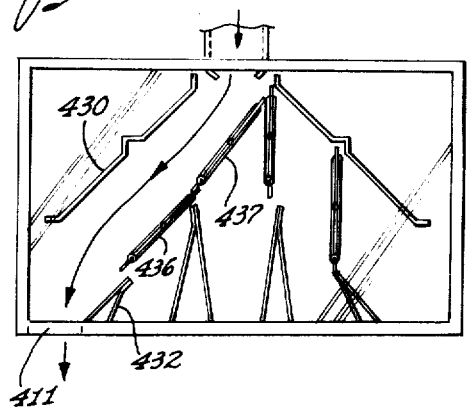

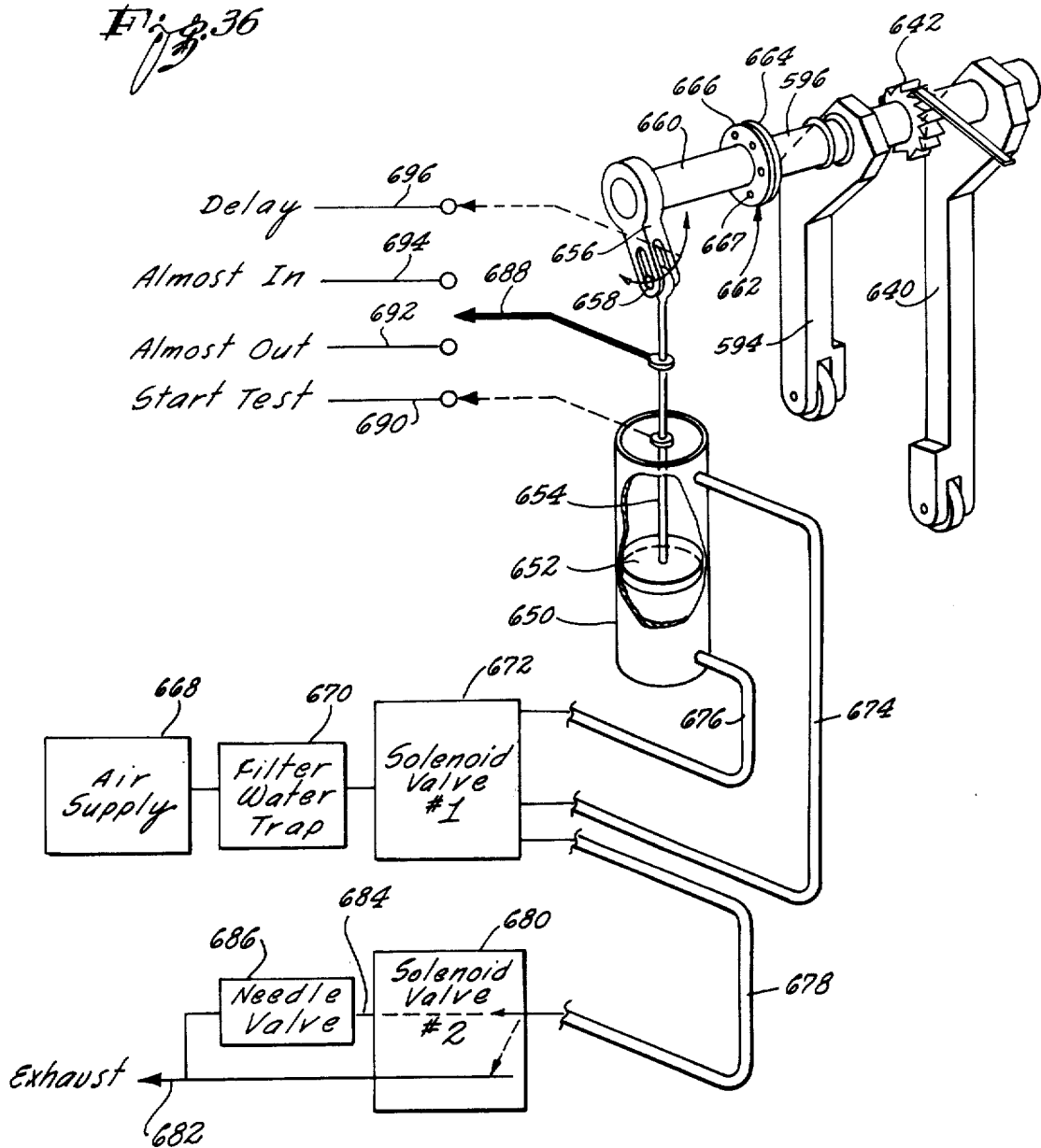

3,899,085

INTEGRATED CIRCUIT HANDLING SYSTEM

This is a division of co-pending application Ser. No. 44,401, filed June 8, 1970, which has matured into U.S. Pat. No. 3,677,401.

BACKGROUND OF THE INVENTION

1. Field of the Invention

This invention relates to a handling system for testing integrated circuits and more particularly, first, to an automatic, high volume handling system for bringing integrated circuit components into contact with a testing device and for sorting the tested components in response to the test results, and, second, to the individual elements of the system.

2. Description of the Prior Art

Over the last few decades there has been rapid technical advances made in the electronic component field toward miniaturization. For example, the integrated circuit (hereinafter referred to as I.C.), which may be defined as a device consisting of a number of circuit elements inseparably associated on or within a continuous body to perform the function of a circuit, has been developed to such an extend that its physical size is quite small. At the same time, techniques have been developed so that these components can be produced in large number on an assembly line basis.

As in any other manufacturing system, testing equipment has been developed to determine the quality of the product being manufactured.

Because the I.C. components are physically small, carriers have been developed. A carrier is a small plastic device which may be used to transport a component during manufacturing and during shipment to a component user; the carrier provides a uniform and consistent outer periphery for ease of handling, and acts to protect the relatively fragile I.C. component from damage. To insure characteristics of an I.C. component it is tested prior to shipment. Various equipment has been developed to handle a component during the testing process. For example, there are devices which are hand loaded one component carrier at a time, having manual mechanisms which move the component into contact with a test contactor and which collect the tested component as it is ejected from the handling device. An environmental device exists which requires hand loading component carriers in a rotatable drum which must then be manually rotated by an operator in a sequential fashion to bring and individual component in contact with the test contactor. All of this prior art equipment, however, lacks the ability to handle components quickly enough to be compatible with a high volume I.C. production system. In addition, other problems, such as frequent jamming, difficult environmental control, high labor costs, low reliability, manual sorting, and nonuniform environmental immersion times, are present with the manual equipment.

SUMMARY OF THE INVENTION

The present invention includes a component handling device comprising a housing; a handling mechanism disposed within said housing and including means for receiving said component and positioning said component at a first level and means for removing said component from said receiving and positioning means, for cooperating to cause said component to move from said first level to a second level, for moving said component into contact with a test contactor and removing said component away from said contactor; and a feeding chute connected to said housing in communication with said receiving and positioning means, said chute including a first opening for serially receiving components, means for guiding said components, said guide means including an elongated projection adapted to be received by a mating elongated groove in a component carrier, and said guide means including a restricted elongated passage, and a second opening for serially emitting said components. In addition, the invention includes an environmental component handling system comprising feeding means for receiving in batch a plurality of components, for orienting said components in a predetermined attitude; conduit means for moving said components from said feeding means to a handling mechanism; an insulated housing for enclosing said handling mechanism; a handling mechanism including a rotatable drum means disposed within said housing for receiving and for temporarily storing components; a transfer means disposed within said housing for receiving serially said components from said receiving and storing means, for moving said components into contact with a test contactor and for moving said components away from said test contactor; an index means connected to said housing for rotating said receiving and storing means; linkage means connected to said housing for cycling said transfer means and for actuating said index means; and electrical and mechanical means for actuating said linkage means. In addition, the invention includes various parts and portions and subcombinations of the systems described.

An object of the present invention is to provide a fully automatic I.C. handling system compatible with high volume I.C. production capabilities.

Another object of the present invention is to provide a fully automatic environmental I.C. handling system which is compatible with high volume I.C. production capabilities.

Another object of the present invention is to provide a feeding chute which will accept carriers in only one attitude and which will test the distortion of the carriers.

Another object of the present invention is to provide an extended feeding track, which will propel carriers along the track and also sense the number of carriers on the track.

Another object of the present invention is to provide a quick connect-disconnect connector for connecting an output chute and a handling mechanism.

Another object of the present invention is to provide an automatic handling mechanism which is quick, efficient, and reliable.

Another object of the present invention is to provide a quick connect-disconnect connector for connecting a test contactor and a handling mechanism.

Another object of the present invention is to provide a five place sorting apparatus which is reliable and has high speed sorting capabilities.

Another object of the present invention is to provide a fan assembly for an environmental handling device which prevents excessive outer surface temperatures when the device is at high temperatures and prevents condensation when the device is at low temperatures.

Another object of the present invention is to provide an insulator for an environmental handling device which effectively insulates the test environment within a temperature range varying from −75° to 150°C., is low in weight, is able to provide relatively thin walls, and is relatively inexpensive.

Still another object of the present invention is to provide a fully automatic I.C. environment handling system which is quick, efficient, and reliable.

BRIEF DESCRIPTION OF THE DRAWINGS

FIG. 5 is an elevational view partially broken away of an extended feeding track.

FIG. 6 is a sectional view taken along line 6—6 of FIG. 5.

FIG. 7 is an elevational view partially in diagrammatic form illustrating a set of wheels for moving a carrier through the extended track.

FIG. 8 is a perspective view of a connector attached to an output chute in a position to receive a magazine.

FIG. 9 is an elevational sectional view taken along 9—9 of FIG. 8 illustrating the magazine in a connected position.

FIG. 9a is a perspective view of the locking shaft shown in FIGS. 8 and 9.

FIG. 10 is a plan view partially broken away of a handling mechanism, shown in a position to receive a carrier with a component from a feeding device.

FIG. 11 is a reduced sectional elevational view taken along line 11—11 of FIG. 10.

FIG. 12 is an enlarged elevational sectional view of a portion of the handling mechanism of FIGS. 10 and 11.

FIG. 13 is an enlarged elevational sectional view of a portion of the handling mechanism of FIGS. 10 and 11.

FIG. 14 is a plan view of a portion of the mechanism of FIG. 10 illustrating the component carrier in test position.

FIG. 15 is an enlarged elevational sectional view of a portion of the mechanism of FIGS. 10 and 11.

FIG. 16 is a partially broken away perspective view of a portion of the mechanism of FIG. 10.

FIG. 17 is a partial elevational view illustrating a portion of the mechanism of FIG. 16.

FIG. 18 is a perspective view of a quick connect-disconnect connector for connecting a test contactor to the housing of a handling mechanism.

FIG. 19 is an elevational view of a portion of the connector of FIG. 18.

FIG. 20 is a perspective view of a sorting apparatus having the capability of sorting products into five groups.

FIG. 21 is a rear elevational view partially in diagrammatic form of a portion of the sorting apparatus of FIG. 20.

FIG. 22 is a front elevational view of the portion of the sorting apparatus of FIG. 21 illustrating the sorting apparatus set to deposit a product in the middle of the five sorting locations.

FIG. 23 illustrates the portion of the sorting apparatus set to deposit a product in one of the right side sorting locations.

FIG. 24 illustrates the portion of the sorting apparatus set to deposit a product in one of the left side sorting locations.

FIG. 25 illustrates the portion of the sorting apparatus set to deposit a product in the far right location.

FIG. 26 illustrates the portion of the sorting apparatus set to deposit a product in the far left location.

FIG. 36 is a diagrammatic illustration of the means for moving the handling mechanism of FIG. 30.

DESCRIPTION OF THE EMBODIMENTS

Figure 1:
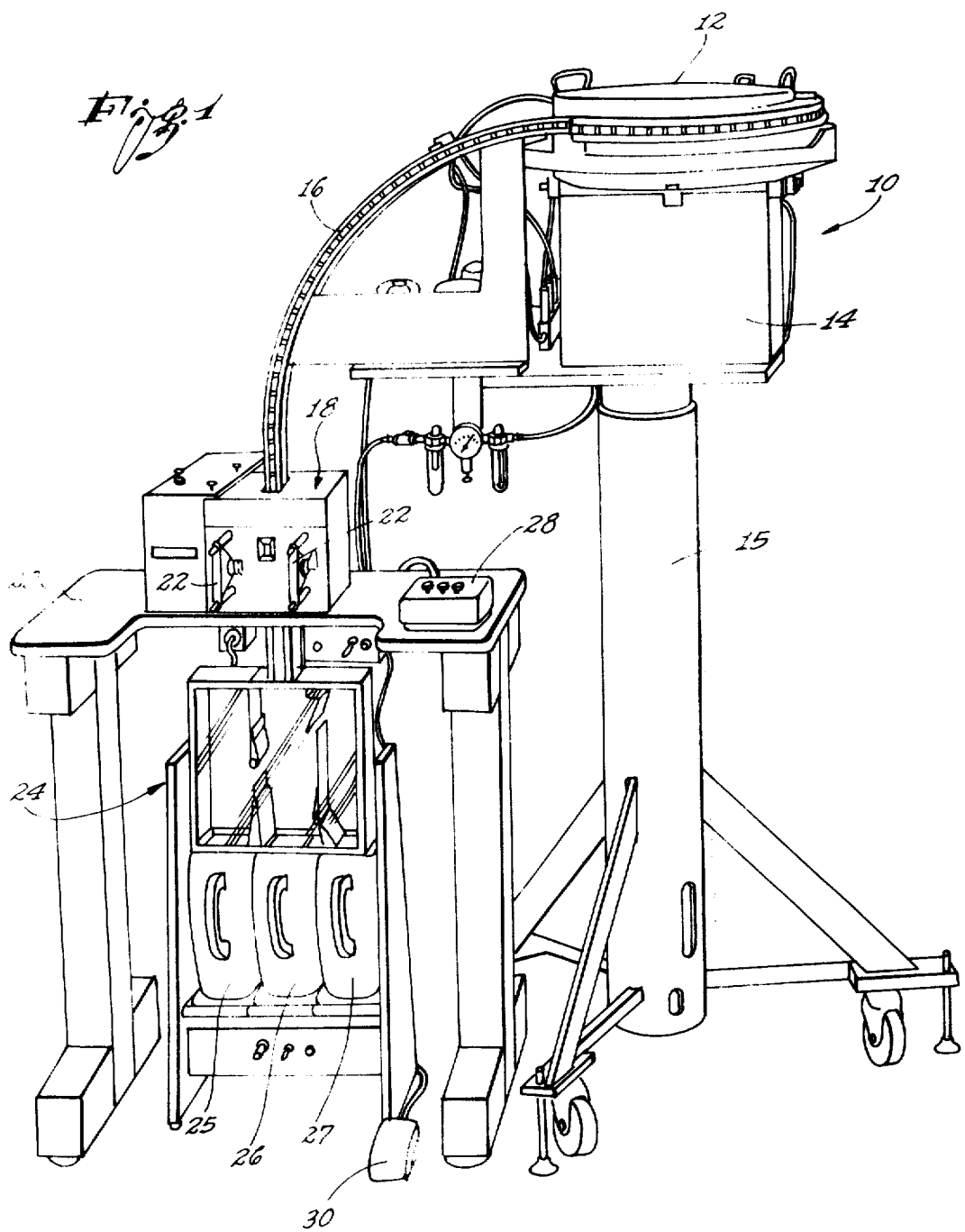
FIG. 1 is a perspective view of an automatic handling system for the testing of I.C. components.

FIG. 1 illustrates an automatic I.C. handling system comprising three main parts. The first part of the system is a feeding device; the feeding device receives completely manufactured I.C. components which have been previously placed in carriers, such as the carriers illustrated in FIGS. 2a, 2b, and 2c. The components may be oriented by hand before being inserted into a handling mechanism or may be deposited in batch fashion in a device which orients the carriers, such as a vibratory feeder 10, as illustrated in FIG. 1. The vibratory feeder comprises a large bowl 12 into which carriers may be dumped and a vibration mechanism (not shown) within the housing 14 which causes the bowl to be vibrated at some predetermined frequency. The vibrations cause the carriers to be moved toward a track which will orient the carriers in one attitude only and which accept the carriers in a serial fashion. The vibratory feeder may be positioned in any convenient fashion, such as atop a movable stand 15, so that the feeder is at a higher altitude than the remainder of the system to allow gravity feeding. Vibratory feeders are well known, and a suitable feeder may be purchased from Automation Services Inc., of Fairview, Pennsylvania. As will be described hereinbelow, other types of feeding devices may be used in the system without disturbing the other two main parts of the system. This interchangeability concept is applicable to all the main parts of the system.

A feeding track 16 connects the vibratory feeder 10 to the second main part of the system, that is, to a handling mechanism 18. The function of a handling mechanism is to receive a component in a carrier, move the component into contact with a test contactor, hold the component in test position for a predetermined period of time until a test has been completed, and then eject the component to a collection device, such as a sorting apparatus. As shown in FIG. 1, the handling mechanism 18 is positioned upon a table 20. A test contactor (not shown in FIG. 1) would be connected to the handling mechanism 18 by the pair of connectors 22, and the test contactor communicates with a computer which will perform predetermined tests upon each of the I.C. components to determine characteristics.

After a component has been tested, the computer may deliver a signal to the third part of the system, such as to the sorting apparatus 24, shown in FIG. 1. The sorting apparatus will direct the tested component to one of the three containers 25, 26 or 27 for temporary storage.

Since the system is made up of three main parts, and various interchangeable devices are available for each of the system's parts, it is to be understood that various combinations can be advised depending upon which of the devices are put together. For example, a hand feeding device, shown in FIG. 3, or the vibratory feeding device of FIG. 1 can be used as a first part. In a similar fashion, an environmental handling mechanism, such as shown in FIGS. 27–36, may be substituted for the handling mechanism 18, FIG. 1 (as more fully illustrated in FIGS. 10–17). The third part may feature the three bin sorting apparatus 24, FIG. 1, a five bin sorting apparatus. FIGS. 20–36, a three magazine sorting device (not shown), a single magazine or any other receiving and containing device for accepting the output from the handling mechanism. The particular system chosen will be a function of such factors as production capabilities and cost.

While the entire system shown in FIG. 1 may be automatic once the component carriers are deposited in the bowl 12 to the time an operator empties the three containers 25, 26, and 27, various parts of the unit may be manually operated by foot or hand. For example, a hand actuating unit 28, having three buttons, may be used to operate the three bin sorting apparatus 24. In a like fashion a foot pedal 30 may be provided to actuate the handling mechanism 18.

Figure 2A:
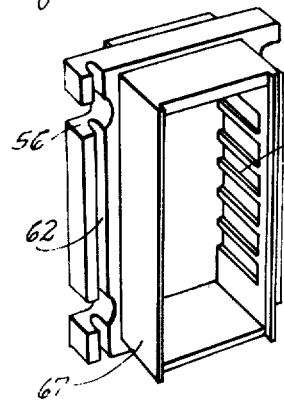
FIG. 2a is a perspective view of one embodiment of an I.C. carrier.
Figure 2B:
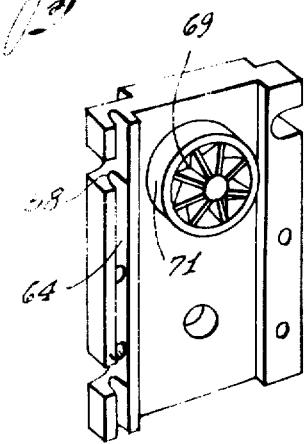
FIG. 2b is a perspective view of another embodiment of an I.C. carrier.
Figure 2C:
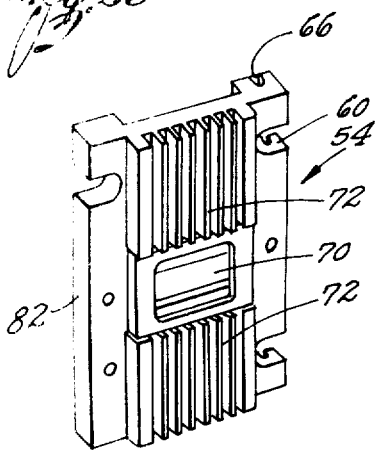
FIG. 2c is a perspective view of a third embodiment of an I.C. carrier.

Referring now to FIGS. 2a, 2b, and 2c, there is illustrated in more detail three carriers which are designed to carry the three most popular I.C. components. Most I.C. manufacturers will offer a given circuit in any of three packages which are commonly termed DIP, TO-5, and Flatpack. For example, carrier 50, FIG. 2a, is especially designed for the DIP package, carrier 52, FIG. 2b, is for a TO-5 package, and carrier 54, FIG. 2c, is for a Flatpack package. It is to be understood that each of the carriers 50, 52, and 54 have identical peripheral dimensions and are each polarized in two different ways. First, each of the carriers has peripheral cutouts, such as cutout 56 of the carrier 50, cutout 58 of the carrier 52, and cutout 60 of the carrier 54; secondly, and more importantly herein, each carrier has a longitudinally extending groove, such as a groove 62 of the carrier 50, a groove 64 of the carrier 52, and a groove 66 of the carrier 54. One or both of the polarizing features enable efficient and reliable means for allowing the carriers to be used in an automatic handling system, as described in FIG. 1, for example. It is to be understood that the carriers are provided for the purpose of establishing a form of standardization to allow automatic handling by various types of equipment of various types of I.C. packages. Carriers such as illustrated in FIGS. 2a, 2b, and 2c may be purchased from the Barnes Corporation of Lansdowne, Pennsylvania.

As shown in FIGS. 2a and 2b, and I.C. component would have its head portion positioned on or within the carrier so as to have the electrical leads extending away from the viewer; for example, the leads of the DIP package would be positioned to fall within the recesses 68 of the carrier 50, while the head portion would be surrounded by the walls 67 so as to block the view of the leads and the recesses 68. The leads of the TO-5 would extend through openings, such as opening 69 of the carrier 52, while the head portion would be positioned to block the view of the circular wall 71. The Flatpack carrier 54 is illustrated rotated 180° relative the DIP and TO-5 carriers 50 and 52, respectively, and would have the head portion of the I.C. component positioned above an opening 70 with the leads located within the series of recesses 72 extending longitudinally to either side of the opening 70.

Figure 4:
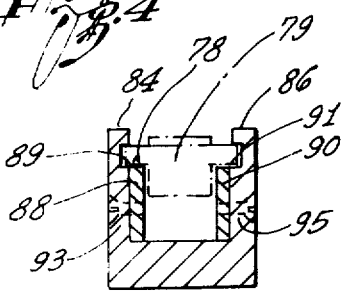
FIG. 4 is a sectional view taken along line 4—4 of FIG. 3.
Figure 3:
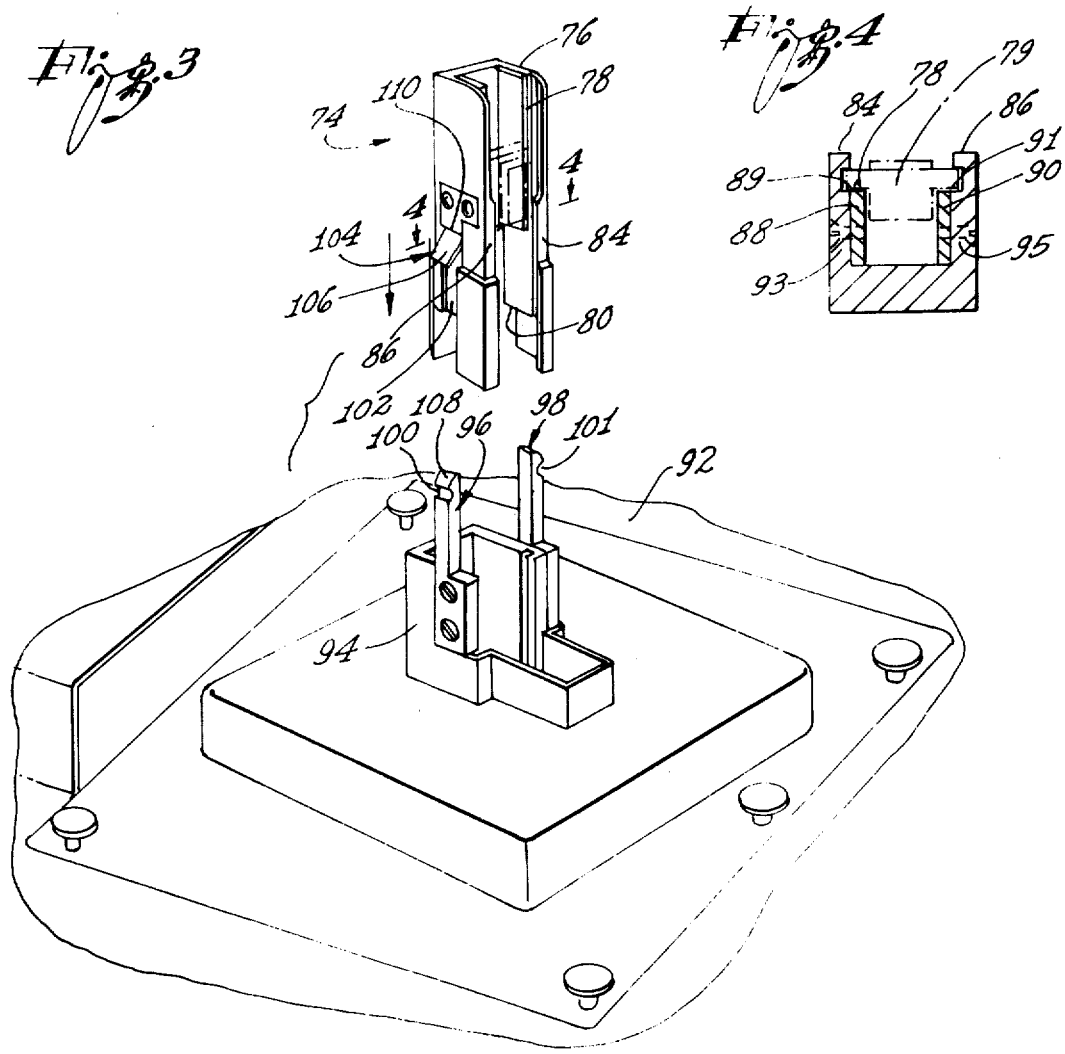
FIG. 3 is a partially exploded view of a feeding chute and illustrates a carrier in phantom line.

Referring now to FIGS. 3 and 4, there is illustrated a channel-shaped feeding chute 74 having an upper end opening 76 to receive a component carrier, such as one of those shown in FIGS. 2a, 2b, and 2c. The chute is designed so that carriers can only be inserted serially in one way to insure that the component leads are properly positioned to come into contact with a test contactor. With the position of the chute 74 as shown the attitude of a carrier would be identical to that shown in FIG. 2c. Secondly, the chute is designed so that carriers which have been improperly manufactured or have been damaged through prior use and which could cause a jamming of the handling mechanism will not be accepted beyond a predetermined location. The advantage of a carrier checker is to quickly find and dispose of unacceptable carriers without necessitating stoppage of the system, opening the handling mechanism, and removing a jammed or disoriented carrier. It is, of course, understood that a main advantage of any handling system, and the present system in particular, is the rapid handling of a component so as to be compatible with a high rate production system.

To achieve orientation the feeding chute 74 has an elongated projection 78 which extends in a longitudinal direction from the top opening 76 part way toward a bottom opening 80 from which the component carriers are serially emitted and received by a handling mechanism. The projection 78 corresponds to engage the longitudinal groove of a carrier, such as the longitudinal groove 62 of the carrier 50, FIG. 2a. Hence, the carrier can be inserted in only one attitude which is compatible with the handling mechanism. For example, the carriers 50 and 52 shown in FIGS. 2a and 2b, respectively, would be inserted into the chute 74 in a position 180° from that shown, while the carrier illustrated in FIG. 2c would be inserted in its present attitude as already mentioned.

Usually after a great deal of use or due to an improper forming operation, it is possible that the longitudinal peripheries of a carrier may be distorted so as to enhance the probability of jamming the handling mechanism. For example, referring to FIG. 2c, the longitudinal surface 82 may have become bowed or twisted to such a degree that it would be inadvisable to have the handling mechanism accept the carrier. The feeding chute 74 is provided with two lip portions 84 and 86 which combine with guide plates 88 and 90 and flange surfaces 89 and 91 to form restricted elongated passages which are slightly larger in dimension than the lateral width of the longitudinal periphery of a carrier, such as the carrier 79 drawn in phantom. Thus, should the carrier be distorted, bowed, or twisted in any fashion, the feeding chute will prevent the carrier from proceeding any further than the restrictive passages. As shown, the guide plates 88 and 90 are connected by fasteners to the two legs 93 and 95 of the channel-shaped chute. Additionally, it is noted that the projection 78 is integral with the guide plate 88.

In order to securely attach the chute to the upper portion of a handling mechanism so that the components may be gravity fed through the system, a handling mechanism housing 92 has connected to it a channel-shaped input chute 94, which, in turn, has attached to it two oppositely disposed posts 96 and 98 which are commonly referred to as bayonet fittings. Each of the posts 96 and 98 has a lateral slot, such as a slot 100 in the post 96 and a slot 101 in the post 98. The chute 74 is provided with oppositely disposed recesses, such as recess 102 (only one of the recesses is shown in FIG. 3) which engages the posts 96 and 98 in a tight, sliding fit. To insure connection the chute is fitted with two flexible spring members, only one of which is shown, spring member 104, which may be constructed of spring steel. The member 104 has a flared portion 106 which will act as a cam follower surface when in contact with the upper rounded portion 108 of the post 96. The member 104 also includes an indent portion 110 which will snap into the groove 100 when the chute is fully engaged. As mentioned earlier the feeding or input chute may be used as the first part of a handling system in place of the vibratory feeder 10, FIG. 1.

Referring now to FIGS. 5 and 6, there is illustrated a feeding conduit 120 for moving component carriers over an extended distance or to a higher position. The feeding conduit generally connects a handling mechanism to an automatic feeding device, such as the vibratory feeder 10, FIG. 1. The conduit 120 comprises an elongated passageway formed from a number of channel-shaped sections, such as a short first straight section 122 which establishes the input end 123 of the conduit and which is located immediately adjacent the output end of 124 of a feeding device. Adjoining the first straight section 122 is a first curved section 126 which changes the direction of the passageway from a generally horizontal direction to a vertical direction. Proceeding along the passageway to successive adjoining sections are a second straight section 128, a second curved section 130, a third straight section 132, a third curved section 134, and a fourth straight section 136 which ends at the output end 137 of the conduit. The output end adjoins an input chute 138 of a handling mechanism. The fourth section 136 is twisted slightly, as shown, so that it is compatible with an input chute, such as that shown in FIG. 3, which is shown in a slightly angular position. The reason for the input chute position will become clear after reviewing the description of FIGS. 30–36. It is, of course, understood that the fourth section 136 could also be a nontwisted section if the handling mechanism is compatible. Each section is channel-shaped having parallel inner and outer recesses extending the length of the passageway; for example, as illustrated in FIG. 6, the curved section 130 has outer recesses 142 and 144 and inner recesses 146 and 148. The purpose of the outer recesses is to provide an engagement by which a plastic closure 150 may be secured to the channel section. The plastic closure 150 has two projections 152 and 154 which are slidably engaged with the outer recesses 142 and 144, respectively. The inner recesses 146 and 148 act as a guide or a track for the traveling component carriers, such as exemplified by the carrier 156, which is shown in phantom line. The channel sections may be made of any convenient material, such as a workable metal like aluminum or may be conveniently made of an extruded synthetic resin material.

Located at each junction where two sections come together is a generally channel-shaped connector, such as exemplified by a connector 158 connecting sections 128 and 130. Each connector includes four fasteners, two of which attach the connector to one track section and the other two of which connect the connector to the adjoining track section; for example, the connector 158 has two threaded fasteners, such as screws 160 and 161, which attach to the curved section 130, while two other screws 162 and 163 connect to the straight section 128. Four other connectors 164, 165, 166, and 167 function identically to connector 158 and cooperate to rigidify the conduit as shown. Still another connector 168 is provided between the curved section 134 and the straight section 136 which connects the sections and acts as a mounting element for a sensing means, which will be described in more detail hereinbelow.

In FIG. 5, the component carriers are moved through the conduit in a serial fashion by a continuous stream of high pressure air. As shown, the curved section 126 has a mounting appendage 170 to which a hose 172 is connected for directing air from a high pressure source (not shown), through an opening 174 in the leg wall of the section 126. As shown, the curved section 126 causes a 90° change of conduit direction; by mounting the air hose at approximately 45° relative either end of the section and near its midpoint, the air stream enters the conduit tangentially. In a preferred embodiment constructed of metal where the component carriers are of plastic and there is a loose, sliding engagement between the carrier and the inner recesses, such as the recesses 146 and 148, then a blast of air introduced, as shown, will provide a sufficient force to move a carrier beyond the curved section 130 to the curved section 134 where gravity will provide the necessary moving force to drive the carrier into the handling mechanism. As an example, where the conduit is 85 inches long, the vertical height between the straight section 122 and the straight section 132 is 42 inches. A pressure source supplying air at 100 pounds per square inch will provide adequate force to move the carriers in the prescribed manner.

Referring now to FIG. 7, there is illustrated an alternate way in which the carriers may be propelled through the conduit. A plan view is shown of a portion of a channel-shaped section 174, through which a carrier 176 is moving. Each of the legs of the section 174 has a slot, such as the opposite slots 178 and 180, to receive a small wheel, such as wheels 182 and 184, respectively. It is to be understood that the slot openings 178 and 180 are made through that portion of the leg between the inner and outer recesses of the section (refer to FIG. 6) so that the wheels may come into contact with the periphery of a carrier which rides within the inner recesses. Each of the wheels is connected to an external power source 186; the entire assembly of wheels, mounting support, drive mechanisms, and power source may be mounted to the particular section in a manner analogous to that shown for the air propulsion system of FIG. 5. By continually rotating the wheels 182 and 184, the wheel 182 rotating counterclockwise and the wheel 184 rotating clockwise, carriers will be catapulted in an upward direction, as depicted in the drawing of FIG. 7.

Affixed to the connector 168 and to an end connector 187 is a device for sensing the number of carriers adjacent to the output end 137 of the conduit. The sensing device comprises an upper light source 188 and a corresponding upper photo detector 190 mounted to connector 168 and a lower light source 192 and corresponding lower photo detector 194 mounted to connector 187. The two sensors are placed at predetermined locations, the bottom sensor 192, 194 being located sufficiently close to the output end of the conduit 137 so as to signal when the incoming component carriers are no longer backed up beyond the sensor. Such a signal may be used to shut down the handling system to conserve power or to indicate that more component carriers must be fed into the system. The upper sensor 188, 190 is positioned close to the location where the carriers begin their free fall under the influence of gravity. The purpose of the upper sensor is to prevent a back up of carriers within the curved section 134. Such a back up may cause carriers to be stranded in that portion of the section which is vertical.

In operation no signal is generated as long as carriers interfere with the transmission of light from the light source 192 to the photo detector 194. However, should the carrier level recede below the sensor 192, 194, a signal will be generated. In opposite fashion no signal is generated as long as there is no prolonged interference of the beam of light from the upper light source 188 to the upper photosensor 190. A no signal mode will mean that the level of the component carriers waiting to be received by the handling mechanism is somewhere between the two sets of sensing devices. It is, of course, understood that while the conduit of FIG. 5 is shown as a relatively elongated passage, it may be shortened if it is found desirable to utilize the sensing devices to achieve a more fully automatic system.

Some of the advantages of having a feeding conduit, such as shown in FIGS. 5, 6, and 7, are that a handling device and a feeding device, such as the vibratory feeder 10, FIG. 1, may be spaced from one another; or the handling device may be located at a higher level than the feeding device. In either situation (or in case of both situations existing at the same time) a user of the handling system is provided with a considerable flexibility in utilizing available floor space for this equipment. Further, the conduit frees the feeding device from a dependency upon gravity as a prime motive force to move the carriers.

The conduit may be considered a portion of the first part of the system, as detailed above in relation to FIG. 1.

Referring now to FIGS. 8, 9, and 9a, there is illustrated a feeding chute connector 191, which may be used to connect the output chute of a handling mechanism to another chute which may be used in place of the sorting apparatus shown in FIG. 1. For example, it may be desirable to collect all of the tested components in a chute magazine in the same order as tested to facilitate later handling of the components. The connector 191 is a channel-shaped member having a base portion 193 and two leg portions 195 and 196. The channel member has two end portions, a first end portion 198 connected to an output chute 200 by threaded fasteners 202 and the second end portion 204 which is adapted to receive a chute 206.

The connector includes a handle 208 and shaft 210. The shaft extends from the leg 195 to the leg 196 along a semicylindrical groove 212 within the base 193. The shaft 210 extends through openings in each of the legs and is conveniently restrained by a locking washer (not shown) on one side and the handle 208 on the other side so that lateral movement in a direction parallel to the longitudinal axis of the shaft 210 is prevented; however, the shaft is freely rotatable in its longitudinal axis.

As shown clearly in FIGS. 9 and 9a, a portion of the shaft has a semicircular cross section; the shaft comprises a flat surface 214 and a semicylindrical portion 215, extending along a substantial portion of the length of the shaft and two cylindrical ends 216 and 220. The shaft 210 is rotatable between the two positions, a first position, as shown in FIGS. 8 and 9a, in which the handle 208 is generally in an upright position so that the semicylindrical portion 215 is positioned within the groove 212 and the flat portion 214 is essentially flush with the inner surface 218 of the base portion 193 and a second position in which the semicylindrical portion 215 is positioned within a semicylindrical groove 222 of the chute 206. The first position is referred to as the unlocked position and the second position is referred to as the locked position (see FIG. 9). In the first position the connector is ready to receive the chute 206 within the space defined between the base portion 193 and the legs 195 and 196. Once received the handle and shaft are rotated counterclockwise as depicted by the arrow in FIG. 8, to the second or locking position. When the groove 222 is aligned with the portion 215 of the shaft and the shaft is rotated, the chute 206 becomes firmly locked in position. To maintain the unlocked position of handle 208 in order to permit insertion of chute 206, a stop pin 221, FIG. 8, is provided attached to the leg 195.

A major advantage of the connector is the ease and thereby the quickness by which the connector may be moved between its locked and unlocked modes. Another advantage is the simplicity of construction which insures reliability and relatively low manufacturing costs.

As mentioned, the connector 191 may be used to connect the second and third parts of the system as described in relation to FIG. 1.

Referring now to FIGS. 10 through 17, there is illustrated in detail a handling mechanism for bringing a component in a carrier into contact with a test contactor. The handling mechanism 230 comprises a support structure including a front plate 232, a back plate 234, and two side plates 236 and 238. Additionally, the support structure includes a forward top plate 240, a rearward top plate-block 242, a bottom plate 243, and two guide rods 244 and 246. The guide rods 244 and 246 are connected to and extend between the front plate 232 and the back plate 234. The two top plates 240 and 242 are connected to and extend between the side plates 236 and 238, while the side plates are also connected to the front and rear plates. Slidable along the guide rods 244 and 246 is a transporter 248, which includes two front lateral bearing arms 250 and 252 and two rear lateral bearing arms 254 and 256. Each of the bearing arms has an opening to receive one of the two guide rods; for example, the bearing arms 252 and 256 receive the guide rod 246, while the bearing arms 250 and 254 receive the guide rod 244.

Connected to the transporter 248 is a cam surface in the form of linear channel 258, which receives a cam follower plug 260. The cam follower plug is connected to a pivotable link 262, which, in turn, is connected to a shaft 264 and a second pivotable link 266. The second link 266 is connected to a rod arm 268 of a piston within an air cylinder (not shown) which supplies the motive force to operate the mechanism. Reciprocating motion of the piston is transmitted through pivoting motion of the links 266 and 262 to a reciprocating motion of the transporter along the guide rods. The transporter moves between two positions, a first position wherein the bearing arms 254, 256 are adjacent the rear plate 234, FIG. 10, and a second position wherein the bearing arms 250, 252 are adjacent the front plate 232, FIG. 14. The link 266 is designed to move through an arc of 180° which, when transmitted to the cam and the transporter, allows for a sufficiently precise movement of the transporter to prevent the transporter from colliding with either the front plate 232 or the rear plate 234. This prevents damage to the mechanism and greatly reduces the noise of operation.

The transporter further comprises two oppositely disposed arms 270 and 272, FIG. 14, each having opposing recesses 274 and 276 which receive a component carrier, such as the carrier 278. The transporter additionally includes an upstanding head portion 280 which extends generally parallel to the two guide rods 244 and 246 from the rear arms 254, 256 to partially between the arms 270 and 272. A component in a carrier, such as carrier 278, is introduced into the mechanism by an input track 282, FIG. 11, which is supported by and connected to the top plate-block 242; connection is made by two threaded fasteners 284 and 286 in the form of bolts. An incoming component carrier will fall through the input track 282 until coming to rest on two stop elements 288 and 290, FIG. 10, which are spaced from one another by a distance slightly less than the spacing between the two arms 270 and 272. The stop elements 288 and 290 are attached with threaded fasteners to the top plate 242.

Positioned adjacent and just below the transporter 248, when the transporter is in its second position, is a support block 292, FIGS. 11 and 14, which is connected to the bottom plate 243 by threaded fasteners, such as fastener 296. Located above the support block 292 are two cam arms 298 and 300, FIGS. 10 and 11. The cam arms are connected to the top plate 240.

The stop elements 288 and 290 first receive a component-carrier as it enters the handling mechanism, the position of the carrier on the elements constituting a first level, FIG. 12. The transporter is at this time in its first position. Upon movement of the transporter to its second position, the component-carrier is taken off the stop elements and drops to the guide block 292, the carrier on the support block constituting a second level, FIG. 13. If for some reason the component-carrier does not drop completely from the first level to the second level, the carrier will be caught between the advancing transporter and the cam arms 298, 300 which will bias the component-carrier to the second level, thereby having it correctly aligned to come into contact with the test contactor 302.

Connected to the transporter is a biasing rod 304, FIGS. 11 and 16. The rod 304 is connected to two arms 306 and 308 by two laterally extending pins 310 and 312, pin 310 extending between the rod and the arm 306 and pin 312 extending between the rod and the arm 308. Each of the arms is pivoted about a threaded fastener 307 or 309 as the case may be which connects a corresponding arm to one of the two transporter arms 270 and 272. More specifically, arm 308 is connected to the transporter arm 270, and arm 306 is connected to the transporter arm 272. Each of the arms 306, 308 opposite the end connected to the pins has a protruding nose, such as nose 314 of the arm 306 and nose 316 of the arm 308. Connected to the top plate 240 is a mounting block 318 through which two rods 320 and 322 are slidable. About each rod on one side of the mounting block 318 is a spring, such as spring 324 about the rod 320 and spring 326 about the rod 322. Each of the rods is capped with a cap nut, such as cap nut 328 on the rod 320 and cap nut 330 on the rod 322. In the position shown in FIG. 10, each of the cap nuts 328 and 330 abuts the plate-block 242. Mounted to the ends of the rods opposite the cap nuts is a depending plate 332 having two downwardly extending fingers 334 and 336. When the transporter is in its second position, FIG. 14, the noses 314 and 316 will abut, respectively, the fingers 334 and 336, FIG. 17. When abutment occurs, the arms 306 and 308 will pivot about their threaded fasteners to transmit linear motion to the biasing rod having the rod extend forwardly, as shown in FIG. 17. The function of the biasing rod is to apply pressure against a component, such as component 340, mounted in the carrier so as to insure a proper seating within the carrier. If the component is properly seated, the component leads 342 will project a sufficient distance to enable the test contactor to make reliable to electrical contact.

Spaced immediately adjacent the support block 292 is an output chute 344, FIG. 11, which is aligned with the input track or chute 282. When the component carrier is being gravity fed through the handling mechanism, the support block 292 will support the carrier during transporter cycle when the transporter is moving from its first position to its second position and during most of the return movement to the first position. The support block extends from the front plate 232 to the output chute 344. Once the carrier reaches the output chute it will drop into a sorting device or other receptacle.

The handling mechanism also includes three switches, a rear switch 346 which is connected to the back plate 234 and which is activated by the linear channel 258 abutting a switch plunger 348, FIG. 10, when the transporter is in its first position. A forward switch 349, FIG. 11, is activated by the bearing arm 250 of the transporter when the transporter is in its second position. A third switch is connected to the rod 268 and is not shown. The function of switches is to signal electronic circuitry to delay the transporter in its first position to allow a new carrier to drop into the mechanism (switch 346) and to start the test of the component when the transporter is in its second position (switch 349).

Referring now to FIGS. 12, 13, and 15, the operation of the handling mechanism is briefly reviewed. As mentioned, upon entering the input track the component-carrier drops to the stop elements which establish a first level. At this time the transporter is in its first position and the rear switch 346 is activated. The transporter then moves towards its second position, causing the component-carrier to be dropped to the support block (or biased to the support block by the cam arms). The carrier makes contact with the test contactor; at the same time the forward switch is activated. After a predetermined period of time, the transporter is returned toward its first position with the carrier being supported by the support block. Upon return to the first position, the carrier is moved off the support block to the output chute where it is emitted from the handling mechanism. At the same time a new carrier has moved into position at the first level, and the rear switch 346 has been activated.

The handling mechanism is quick and reliable and integrates easily with any high I.C. production system. Additionally, the mechanism is quiet and virtually jam proof. The handling mechanisms is the second part of the system as described in relation to FIG. 1.

Referring now to FIGS. 18 and 19, there is illustrated a pair of quick connect-disconnect connectors 360 and 362, which are identical to the pair of connectors 22 of FIG. 1. The function of the connectors is to provide a simple but effective means of connecting a test contactor 364, shown in phantom, to the housing 366 of a handling mechanism. Thus, test contactors may be quickly changed so as to allow the handling system to handle more than one type of I.C. component; test contactors may be changed easily and quickly, thereby keeping down time of the system to a minimum.

Each of the connectors, 360, 362 is identical so that only one full connector will be described, though reference will be made to both connectors, depending upon which connector more clearly illustrates the element being described. Connector 362 comprises an L-shaped retainer 368, having two end portions 370 and 372, FIG. 19. Connected to the housing 366 are four extending posts 374, 376, 378, and 380. The end portion 370 has two openings 382 and 384 to receive respectively the ends of the posts 374 and 376. The end portion 372 has a cam surface 386 which receives a cam follower pin 388 of a locking mechanism 390. The locking mechanism 390 comprises a handle 392 (which is best seen by viewing the connector 360), a cylindrical housing 394 having a serrated inner periphery 395, and a spring (not shown) biased circular disc 396 having a serrated outer periphery 397. The connector 362 is pivotally connectd to the housing 366 by a hinge 398.

The housing is provided with an opening 400, through which communication between the component to be tested and the test contactor 364 is achieved. The test contactor has four elongated openings to receive the four elongated posts 374, 376, 378, and 380 is sliding engagement. During location of the contactor on the posts, the connectors 360, 362 have been pivoted laterally out of the way to allow the sliding engagement of the posts and the contactor. After the contactor has been positioned, the connectors are pivoted into position so that, for example, the openings 382 and 384 of the connector 362 are positioned to receive the posts 374 and 376, respectively. The handle, such as handle 392, is then laterally extended or pivoted to a perpendicular position relative the disc 396. In this fashion cam ends 402, 404 of the handle of bear against the disc 396 so as to force the disc out of its usual engagement with the serrated housing 394. In this position the handle 392 may be rotated causing the cam follower pin 388 to move along the cam surface 386. The movement of the cam follower pin 388 will cause the retainer 368 to be moved in the direction toward the housing 366, thereby tightly sandwiching the test contactor 364 between the housing 366 and the first end portion 370 of the retainer. When the handle can be rotated no longer, it is pivoted back to a position generally parallel to the disc as shown in FIG. 18. When the ends 402, 404 are not bearing on the disc, the spring biases the disc 396 into engagement with the housing 394. Once engagement is made between the serrated peripheries 395 and 397, the retainer 368 is locked in position.

The operation just described involves a few simple movements and may be accomplished very quickly. To remove the test contactor 302 the handle 392 is again pivoted to a perpendicular position relative the disc 396 and rotated in an opposite direction from that used during tightening so that the retainer 368 is loosened. The connector 362 is then rotated about the hinge 398 to allow the test contactor 364 to be slidably disengaged from the housing 366.

Referring now to FIGS. 20 and 21, there is illustrated a sorting apparatus 406 comprising a housing 408 having an upper opening 410 to accept serially components to be sorted. At the opposite end the housing, which is at a lower vertical height than the upper opening 410, are five lower openings 411, 412, 413, 414, and 415. A product which has been directed through one of the lower openings will fall into one of five containers 416, 417, 418, 419, or 420. The housing 408 and the containers are mounted to a support structure 422. The containers are positioned on a shelf 424 which is connected to two side plates of which only side plate 426 is shown. In a similar fashion the housing 408 is also attached to the side plates, and the side plates, in turn, are adjustably connected to the support structure 422 by any suitable fasteners, such as the screws 428. Thus, the unit, comprising the housing 408, the five containers, the shelf, and the side plates, is movable in a vertical direction relative the support structure 422 to add a degree of flexibility to the sorting apparatus to allow its use with any other second part of the I.C. handling system.

Within the housing 408 are six fixed partitions, four of which are generally oblique positions 430, 431, 432, and 433, and two generally vertical partitions 434 and 435. Additionally, there are four pivotal partitions 436, 437, 438, and 439. Each of the pivotal partitions are movable between two positions to determine which of the five alternate paths available a particular tested component will follow so as to drop into the correct container.

The pivotal partitions may be made of any material but preferably are constructed of a suitable synthetic resin because of the low weight, high strength advantages and, in addition, because of the low sound level offered by moving synthetic resin parts as compared to similarly designed metal parts. Each of the pivotal partitions comprises a partition plate 440, having an upper end portion 442, a lower end portion 444, a first lateral edge 446, and a second lateral edge 448. Near the lower end 444 is a tubular opening 450. A shaft 452 extends through the opening 450 and is connected at one end to the front window 456 and at the other end to a back panel 458 so as to support the partition plate and allow it to be pivotal about a center line coincident with the longitudinal axis of the opening 450 and the shaft 452. Spaced a slight distance from the opening 450 in a direction toward the end 442 is a sleeve 460. Located within this sleeve 460 is an arm 462 which is attached to a rotary solenoid 464, FIG. 21. Each partition plate, such as 439, has the lateral edge closest to the back member 458, such as edge 446, reinforced with a strip of fiberglas 474 for added strength. To allow movement of the arm 462 there is an arcuate opening 466 cut in the back element 458. Each of the other pivotal partitions 436, 437, and 438 is constructed in an identical fashion; the partitions are connected respectively to rotary solenoids 468, 470, and 472.

Referring now to FIGS. 22 through 26, there is illustrated the five possible positions and pivotal partitions may assume so as to create each of the five paths which may be followed by a tested component. Each of the pivotal partitions 436, 437, 438, and 439 is movable between a generally vertical position and an oblique or slanted position, depending upon whether or not its corresponding solenoid has been energized. The description of the partition locations assumes that when the solenoid is not energized a partition will be in a vertical position; when the solenoid is energized, the corresponding pivotal partition assumes an oblique position. Thus, in FIG. 22 all of the pivotal partitions are in an upright or vertical position which means none of the solenoids have been energized. After a component has been tested a signal is received by the sorting device to position the partitions; if it is predetermined that a component having particular characteristics is to fall through the opening 413, then the signal received leaves the partitions in their usual upright positions. A path is defined having one boundary comprising the pivotal partition 437 and the fixed partition 434 and another boundary comprising the pivotal partition 438 and the fixed partition 435.

Referring now to FIG. 23, a signal has been received to energize solenoid 472 causing the pivotal partition 438 to pivot to its oblique position, thereby allowing a component to fall through opening 414. The path is defined having one boundary including the pivotal partition 438 and the fixed partition 435 while the other boundary includes the fixed partition 431, the pivotal partition 439, and the fixed partition 433. Referring now to FIG. 24, solenoid 470 has been energized causing the pivotal partition 437 to assume its oblique position, thereby allowing a component to pass through the opening 412. One boundary of the path defined includes the pivotal partition 437 and the fixed partition 434, while the other boundary includes the fixed partition 430, the pivotal partition 436, and the fixed partition 432. In FIG. 25 both solenoids 464 and 472 have been energized causing the pivotal partitions 438 and 439 to assume their oblique positions, thereby forming a path to allow a component to drop through the opening 415. The path is defined having one boundary including the fixed partition 431 and the other boundary including the pivotal partitions 438 and 439 and the fixed partition 433. In FIG. 26 solenoids 468 and 470 have been energized causing the pivotal partitions 436 and 437 to assume their oblique positions, thereby allowing a component to fall through the opening 411. The path defined has for one boundary the fixed partition 430 and has for the other boundary the pivotable partitions 436, 437, and the fixed partition 432. It is noted that even though five possible sorting paths are available no more than two solenoids are energized at one time, thereby conserving energy and reducing movement in the device to a minimum.

The signal to the solenoids may be received from a computer or automatic signal source 480, FIG. 21, or may be received from a manual signal source 482. One form of the manual signal source is shown in FIG. 20 as a box 484 having five push buttons 486, which an operator will manipulate depending upon which container he desires to place the tested component. The automatic signal source may come from the same computer that tests the component. Thus, four of the containers may be designated for receiving components having characteristics falling into four different predetermined ranges and may be used for different applications depending upon the I.C. characteristic requirements stipulated. The fifth container may be used to receive rejected components. It is to be understood that the arrangement of the five containers is strictly arbitrary; although if it can be predetermined that a certain group of I.C. components will have a larger number having a certain characteristic range, then, from an economy standpoint, it may be desired to allow these components to fall through the opening 413 which would require to movement on the part of the sorting apparatus. In a similar manner the next two largest collections to be expected may be designated to fall each through one of the openings 414 or 412, as shown in the FIGS. 23 and 24, respectively, so that only one solenoid need be energized to create the desired path.

Referring once again to FIG. 20, there is illustrated an on-off switch 488, an indicator light 490, and a fuse 492 connected to the shelf 424 to facilitate convenient operation of the sorting apparatus.

Figure 27:
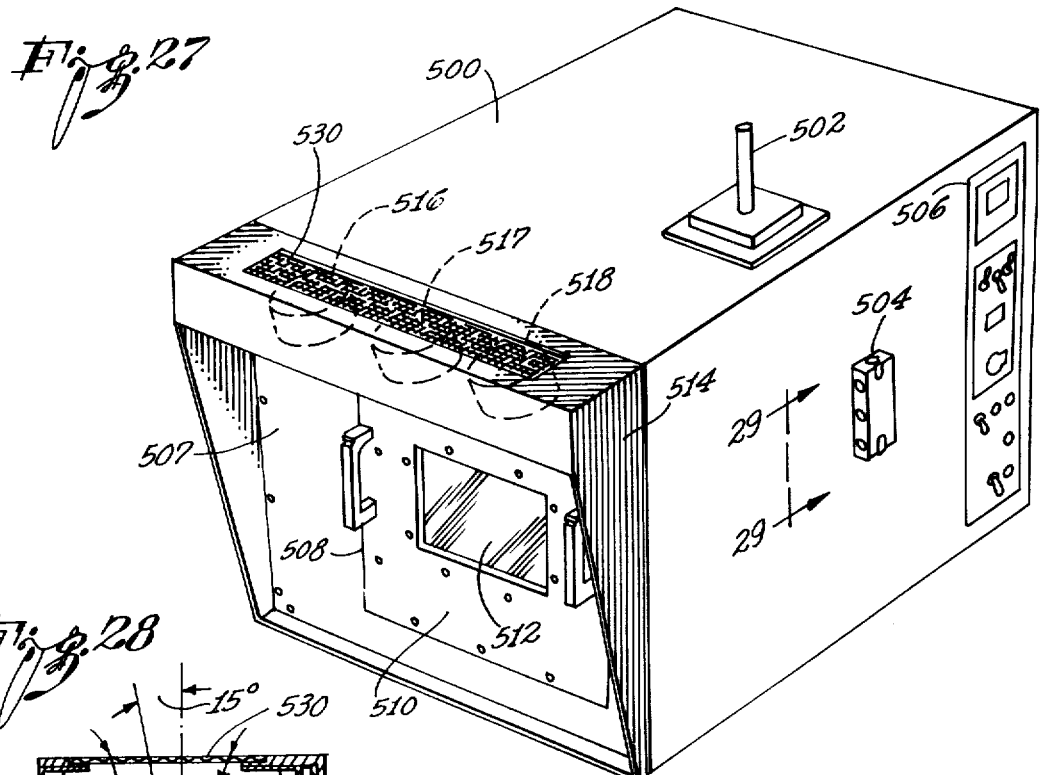
FIG. 27 is a perspective view of an environmental handling device, including a fan enclosure mounted to the housing of the device.
Figure 28:
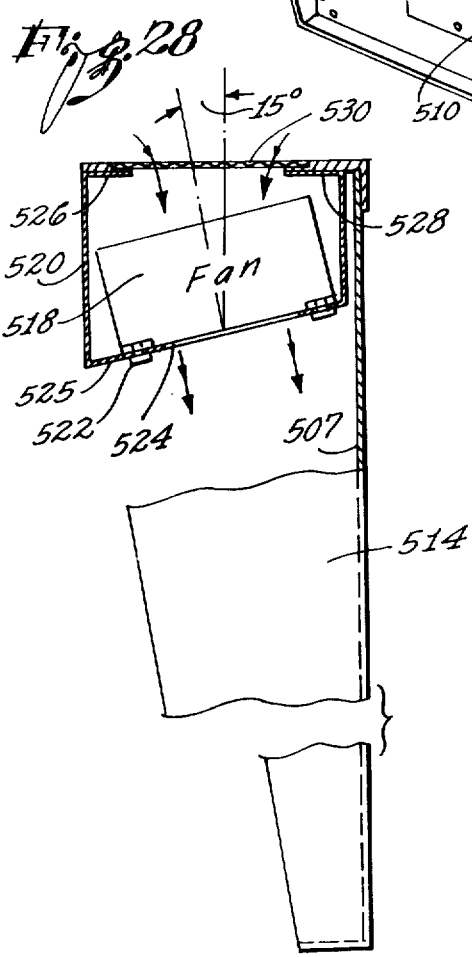
FIG. 28 is an elevational sectional view of the fan enclosure shown in FIG. 27.

Referring now to FIG. 27, there is illustrated an insulated housing 500 for an environmental handling device; within the insulated housing is a handling mechanism, such as that described in relation to FIGS. 10 through 17, or a mechanism which will be described hereinbelow in relation to FIGS. 30 through 36. An input chute 502 is connected to the housing which may be similar in structure and design to that shown in FIG. 3. A mounting bracket 504 is attached to the housing along one of its side for support of a test contactor. Along the same side of the housing is a panel 506 which includes the operating switches and dials, as well as gauges, to actuate, as well as monitor, the operation of the device. On another lateral face of the housing is an opening 508 having a door or hatch 510 with a glass 512 to allow viewing of the internal mechanisms of the handling device. The opening 508 is provided to allow access to the handling mechanism for repair or replacement.

Around the side 507 of the housing 500 is a frame 514 which acts as an enclosure for the side 507, as well as a support for three fans 516, 517, and 518, which are shown in phantom in FIG. 27. The fans are mounted directly to a channel-shaped mounting bracket 520, FIG. 28, by any convenient means, such as by fasteners 522, so that the air stream created by the fan is directed through an opening 524 in the base portion 525 of the mounting bracket 520. Lip portions 526 and 528 of the mounting bracket are connected in any convenient fashion, such as by the use of threaded fasteners (not shown) to the frame 514. Positioned to enclose the open end of the channel-shaped mounting bracket is a grill 530 which allows ambient air to communicate with the fans. In practice, a grill which is 40 percent open has been found to function adequately. Each of the fans 516, 517, and 518 are placed at an angle of about 15° from the vertical so that the air flow from the fan may be directed against the hatch 510 covering the opening 508, as depicted by the arrows in FIG. 28.

The purpose of the fans is to direct a stream of air across the hatch to prevent the hatch 510 and the surface 507 from attaining too high a temperature when the interior of the environmental handling device is at an elevated temperature. The fans are also advantageous when the interior of the environmental handling device is at a low temperature. Without the fans, when the device is cycled between low temperature and ambient temperature, vapor may condence around the window to form a small pool of water; water is undesirable as I.C. components are not only temperature sensitive but humidity sensitive so that the amount of water vapor in a test environment must be strictly controlled.

Figure 29:
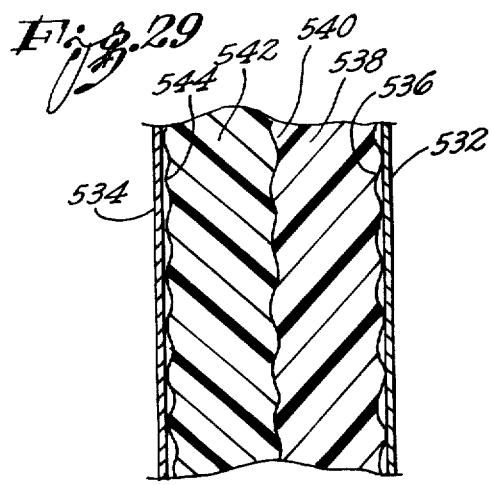
FIG. 29 is an elevational sectional view of the insulation of the housing of FIG. 27, taken along line 29—29 of FIG. 27.

Referring now to FIG. 29, there is illustrated a sectional view of the insulation which allows the handling device of FIG. 27 to efficiently retain any temperature within a range between −75° and 150°C. The insulation comprises an outer shell of metal 532 and an inner shell of metal 534. A suitable metal for the outer shell is aluminum, while a suitable metal for the inner shell is stainless steel. Sandwiched between the inner and outer shells is a first layer of aluminum 536 adjoining a first layer of polyurethane foam 538. A second aluminum foil layer 540 is positioned about midway between the inner and outer shells and is adjoined by a second layer of polyurethane foam 542. Adjoining the second foam layer 542 is a third layer of aluminum foil 544. The insulation is compactly arranged so that the layers of aluminum foil and polyurethane foam form a relatively thin-walled but highly effective insulation for either the retention of heat, if the interior of the device is heated, or insulating the interior from the warmer ambient environment, if the interior of the device is at a low temperature.

In a preferred model of an environmental handling device air circulation is provided by blowers having an output of 140 cubic feet per minute. The interior of the device is heated by applying electrical power to bobbin wound nichrome heating elements, while the interior is cooled by injecting liquid nitrogen into the air circulation through an expansion nozzle.

Referring now to FIGS. 30 through 36, there is illustrated a component handling mechanism to be located within a controlled environment chamber, such as within the interior of the handling device 500, FIG. 27. The handling mechanism receives components mounted to carriers in a serial fashion. The components are then stored within the chamber to allow the components to reach an equilibrium before they are tested. Means are provided to carry the component carrier from its stored location to the test contactor and then to a position where the tested components are ejected from the handling device. Except for the storage device and the particular mechanisms involved, the handling mechanism of FIGS. 30 through 36 functions generally in the same manner as the handling mechanism described above for FIGS. 10 through 17.

Figure 30:
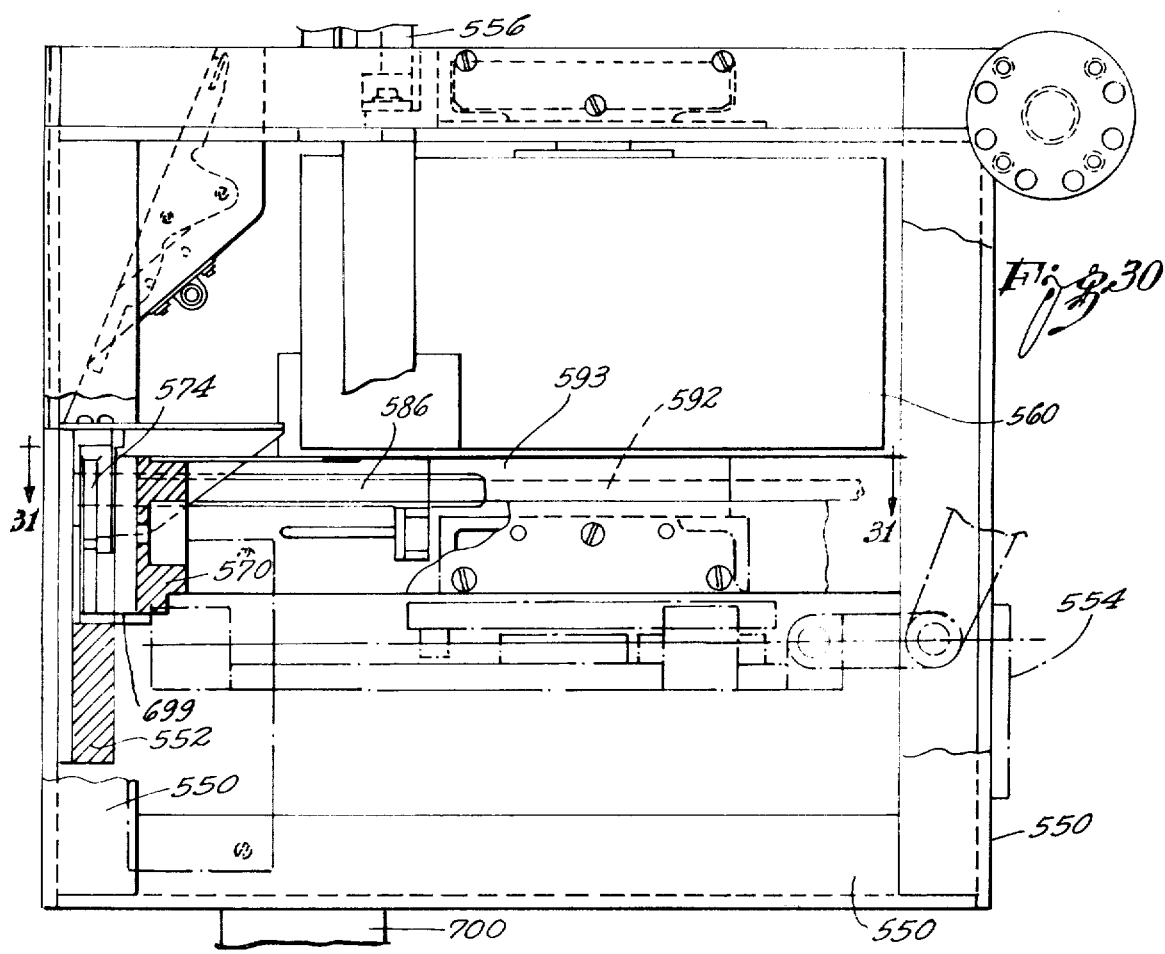
FIG. 30 is a right elevational view of an environmental handling mechanism.
Figure 31:
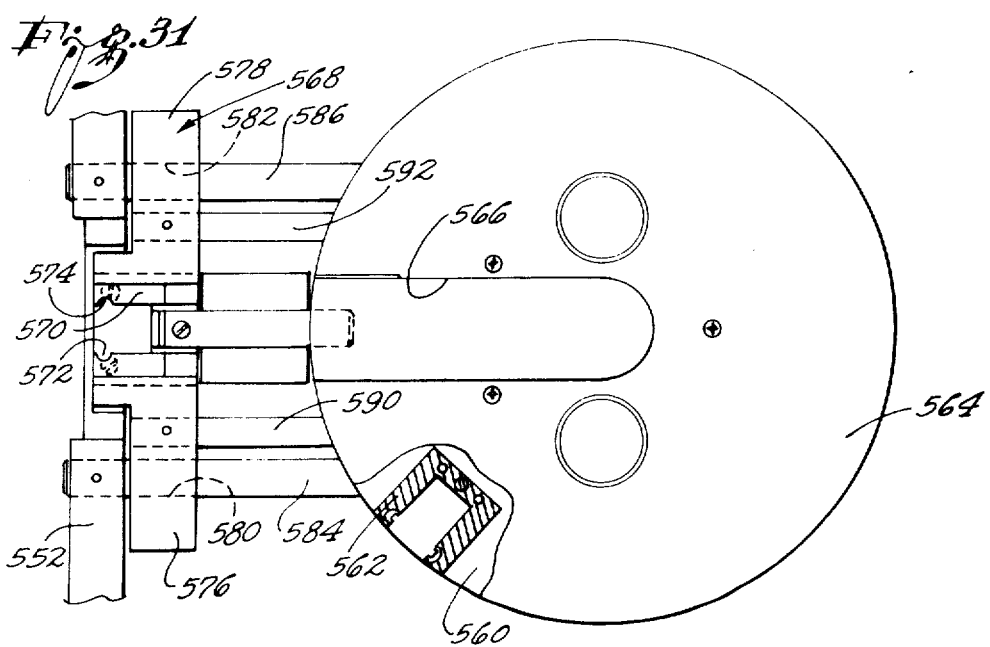
FIG. 31 is a plan sectional view taken along line 31—31 of FIG. 30.
Figure 32:
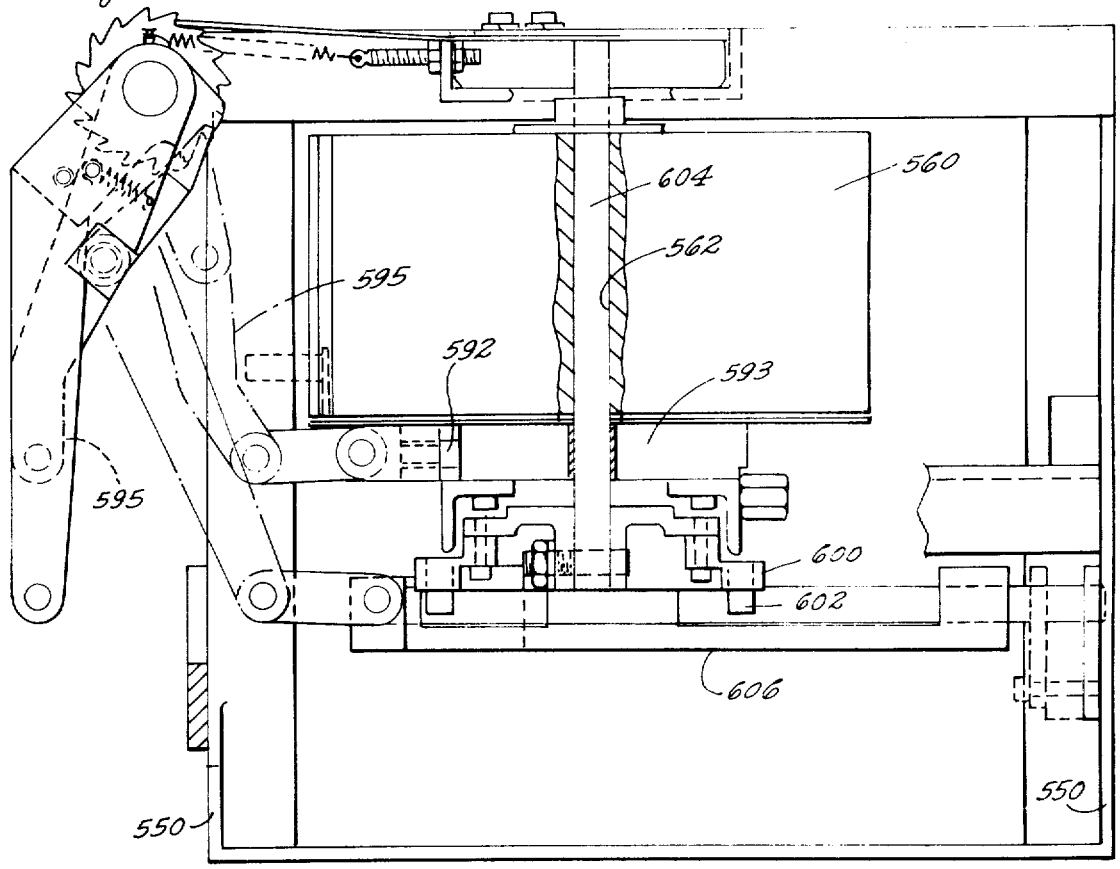
FIG. 32 is a left elevational view of the mechanism shown in FIG. 30.
Figure 33:
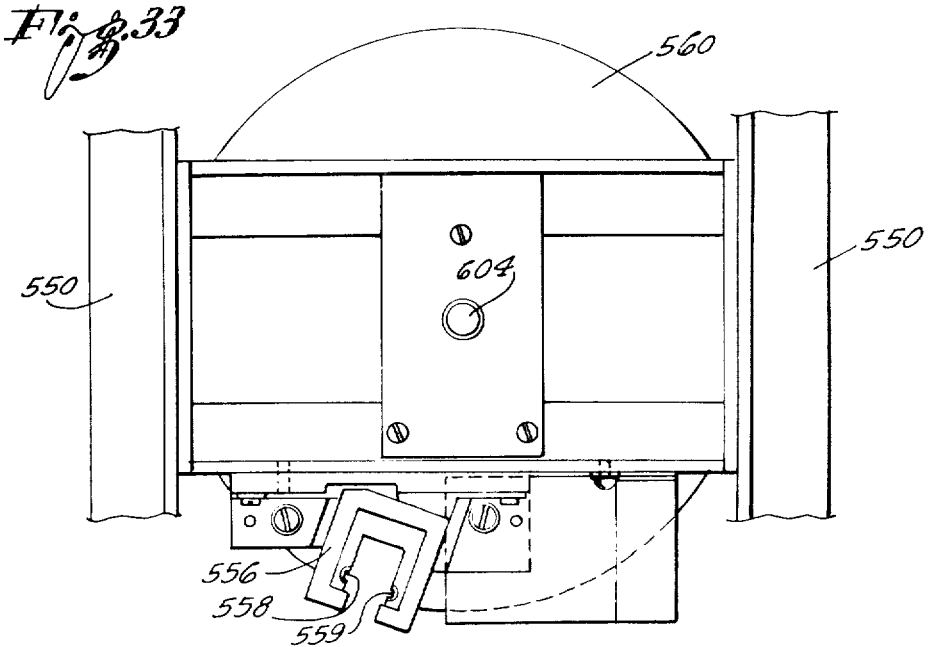
FIG. 33 is a plan view of a portion of the mechanism shown in FIG. 30.
Figure 34:
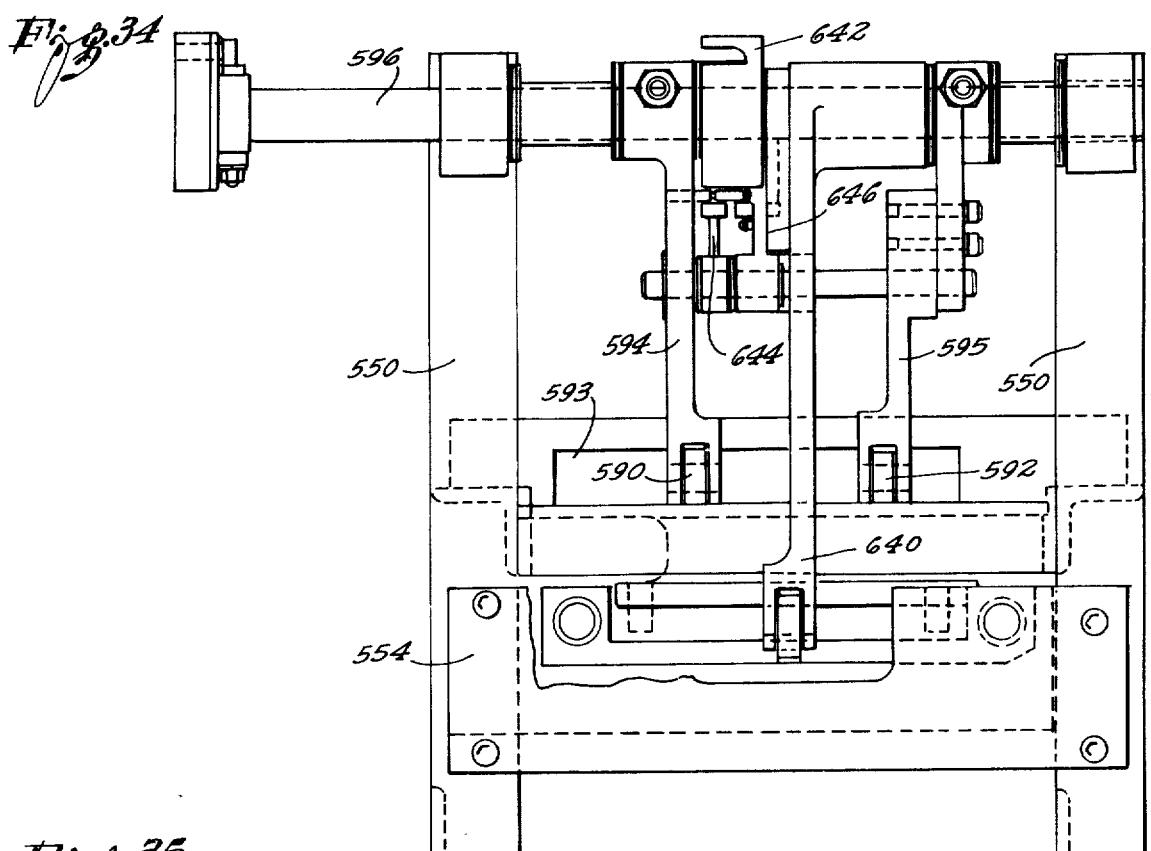
FIG. 34 is a rear elevational view of the mechanism of FIG. 30.
Figure 35:
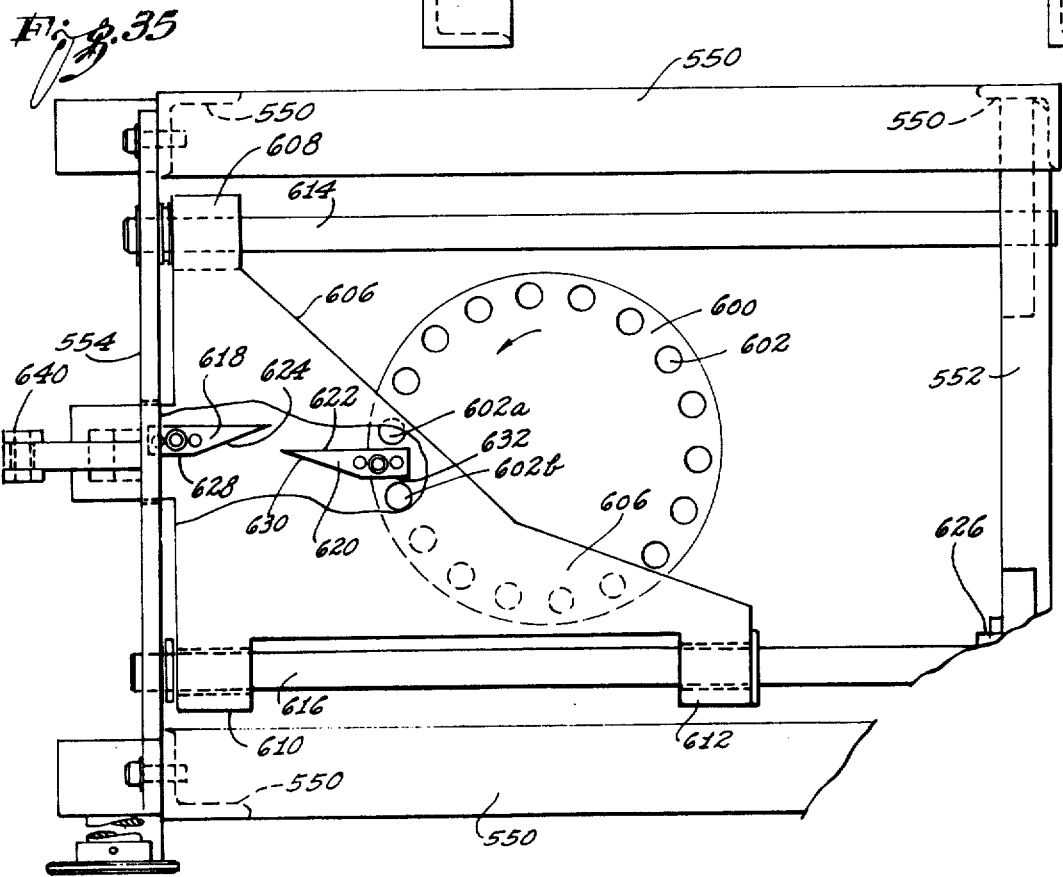
FIG. 35 is a bottom plan view of the mechanism of FIG. 30.

For the sake of clarity, a brief review will be made of the various views shown in FIGS. 30 through 35. FIGS. 30 and 32 are, respectively, right and left elevational views of the handling mechanism; FIG. 34 is a back elevational view; FIG. 33 is a top view; FIG. 35 is a bottom view; and FIG. 31 is a plan sectional view taken along line 31—31 of FIG. 30.

The handling mechanism is comprised of a frame matrix 550, a front plate 552, and a back plate 554, FIGS. 34 and 35. Each component is received serially through an input chute 556 similar to that described for FIG. 3 or in an automatic fashion from a feeding device, such as the vibratory feeder, FIG. 1. Regardless of the method of feeding, the handling mechanism has the input chute 556, FIGS. 30 and 33, which may take the form of a channel-shaped member having opposing grooves 558 and 559 to accommodate the periphery of a component carrier. Aligned with the input chute 556 is a circular drum 560 which is depicted in diagrammatic form in FIGS. 30 and 32 and in more detail in FIG. 31. The drum is rotatably mounted about a shaft 604 through a central opening 56, FIG. 32. The drum is comprised in a preferred form of 18 channel-shaped members 562, FIG. 31, which are identical in shape to the channel-shaped input chute. The channel-shaped members 562 are spaced about the periphery of the drum at 20° intervals and are of a length in one preferred embodiment to receive four component carriers, such as those described in FIGS. 2a, 2b, and 2c; one standard size carrier is an inch long so that the length of each channel-shaped member 562 would be about 4 inches to accommodate four carriers. Thus, the drum can store a total of 72 components under a predetermined environmental condition.

A retainer plate 564 is provided as a stop at the opposite end of the drum from which the components are intially received. The retainer plate has an elongated opening 566 which allows the component carriers from the channel member which is aligned with the opening 566 to deposit serially each of its four carriers to a transfer block 568, FIG. 31. The drum 560 is rotatable in a clockwise direction, as viewed in FIGS. 31 and 33, so that, for example, the channel drum member beneath the input chute 556, FIG. 33, would rotate through 340° before the component carriers within it would begin dropping into the transfer block 568, FIG. 31, for testing. Thus, in FIG. 31 the channel-shaped member 562 is in the process of moving from the fifteenth position to the sixteenth position, after which it will move 20° more to the seventeenth position and then move 20° once again to the 18th position, which would be directly over the opening 566 in the retainer plate. It is, of course, to be understood that the movement through the 340° is at a predetermined rate which will allow each of the storage components to achieve a desired equilibrium with the chamber environment.

The transfer block 568 is comprised of a channel-shaped element 570 having opposing grooves 572 and 574 to engage the periphery of a component carrier in much the same fashion as the input chute 556 and the channel-shaped members 562 of the drum. The transfer block 568 also includes two lateral arms 576 and 578, each of which has an opening 580 and 582, respectively, to receive rods 584 and 586, respectively, in a sliding relationship. Also, connected to the lateral arms 576 and 578 are two actuating shafts 590 and 592, respectively, which provides the force to move the transfer block 568 along the shafts 584 and 586. The slide shafts 584 and 586 are connected at one end to the front plate 522 and supported at the other end to a support block 593, FIG. 30, which is positioned just beneath the drum 560. The actuator shafts 590 and 592 are connected at one end to the transfer block 568 and at the other end to actuator arms 594 and 595, FIGS. 32 and 34. The arms 594 and 595 are in turn connected to a main power shaft 596, FIG. 34, which is rotated in an oscillating fashion to actuate the various parts, as will be explained hereinbelow.

Connected to the drum 560 is an index means for causing the drum to rotate in the proper sequence. The index means comprises a disc plate 600, having 18 extending pins 602. The disc plate 600 is directly attached to the shaft 604, FIG. 32, about which the drum rotates. Cooperating with the disc plate 600 is a sliding cam carrier 606. The cam carrier has three lateral arms 608, 610, and 612, all of which have openings to receive shafts in a sliding relationship similar in nature to that described for the transfer block 568. For example, the lateral arm 608 slides along a rod 614, while the lateral arms 610 and 612 slide along a rod 616. Both the rods 614 and 616 are connected to the front and rear plates 552 and 554, respectively. The cam carrier 606 has attached to the surface nearest the disc plate 600 two cams 618 and 620 which cooperate with the pins 602 to rotate the disc plate 600 and thereby the drum 560 20° each time the cam carrier 606 is reciprocated along the rods 614 and 616. As shown, cam element 620 is positioned between two pins 602a and 602b. When the cam carrier 606 is moved from the rear plate 554 toward the front plate 552, the pin 602a slides relative the flat surface 622 of the cam 620. However, as the carrier continues to move toward the front wall 552, a curved surface 624 of the cams 618 engages the pin 602a and causes it to move in a downward direction, as depicted in FIG. 35, so as to rotate the disc 600 in a counterclockwise direction, as viewed in FIG. 35. When the carrier 606 has its lateral arm 612 abut a stop member 626 adjacent the front plate 552, the pin 602a will be positioned immediately adjacent the straight surface 628 of the cam 618. Upon the return of the carrier from the front plate 552 toward the rear plate 554, the pin 602a will be engaged by the curved surface 630 of the cam 620, causing the pin 602a to be further moved in a downward direction (and again causing the disc to be moved in a counterclockwise direction) so that when the carrier 606 has returned to its original position, as depiced in FIG. 35, the pin 602a will be positioned immediately adjacent the straight surface 632 so as to occupy the position which is occupied in the drawing by pin 602b. In this fashion the pin 602a has been moved an angular distance of 20° causing the drum 560 to be moved a similar distance.

Pivotally connected to the cam carrier 606 and causing it to undergo the reciprocating motion is an index arm 640, FIGS. 34 and 35, which in turn is connected to the power shaft 596. The power shaft 596 undergoes an oscillating motion which is selectively transmitted to the index arm 640. In addition to the two arms 594 and 595, which are also connected to the shaft 596 and which oscillate the transfer block 568, there is connected a ratchet 642 which in turn is connected to two pawls 644 and 646. During oscillating motion of the shaft 596, the arms 594 and 595 are oscillated so as to reciprocate the transfer block 568; each time the transfer block completes a cycle, one component has been tested. Since each of the 18 channel-shaped members of the drum 560 contain, in a preferred embodiment, four component carriers, the arm 640 oscillates every fourth cycle of the transfer blck. Connected to the shaft 596 is a ratchet gear 642; connected to the arm 594 is a pawl 644 and connected to the arm 640 is a pawl 646. The ratchet gear 642 rotates every fourth cycle of the transfer block, causing the arm 640 to be oscillated in response.

Referring now to FIG. 36, there is illustrated the means for cycling the transfer block and for actuating the indexing means which comprises an air cylinder 650 having a piston 652 moving in a reciprocating manner within the cylinder; a piston rod 654 connects the piston and a link 656. Between the rod 654 and the link 656 is a pivotal joint 658. the link 656 is connected to a shaft 660 and is pivotal about a line coincident with the longitudinal axis of the shaft 660 so that as the piston 652 moves within the cylinder 650 an oscillating motion is transferred to the link 656 and from there to the shaft 660.

Shafts 596 and 660 are termed torque tubes, and are provided with self-aligning rigid coupling 662 which slips out of engagement when the mechanism is removed from the chamber for servicing. The coupling 662 comprises two discs 664 and 666 which are connected by a series of bolts 667. In the preferred embodiment the cycling and actuating means, as shown in FIG. 36, is outside the insulated environmental chamber, while the handling mechanism of FIGS. 30 through 35 is located within the environmental chamber. Operation of the cylinder is accomplished by having an air supply 668 communicating with the cylinders 650 through a filter-water trap 670 and through a control means, such as a solenoid operated valve 672, which alternates the supply of high pressure air through a first contuit 674 and a second conduit 676. At the same time the control valve 672 allows the exhaust air from that part of the cylinder which is not in communication with the air supply to be exhausted through a third conduit 678 which communicates the first solenoid valve with a second control solenoid operated valve 680. The second control valve 680 functions to direct the exhaust gas either directly to exhaust by using one path 682 or through a second path 684 in which the exhaust gas is restricted, such as by a needle valve 686.

Connected to the rod 654 is an arm 688 which is rigidly attached to the rod for closing electrical switches to provide signals which are diagrammatically illustrated as a "start test" signal 690, an "almost out" signal 692, an "almost in" signal 694, and a "delay" signal 696.

In operation an electrical control circuitry actuates the control valve 672 to supply high pressure air through either of the conduits 674 or 676. If air is supplied through the conduit 674, then the piston 652 is driven in a downward direction, as depicted in drawing FIG. 36. The downward movement of the piston drives the exhaust air through the conduits 676 and 678 to the second control valve 680. As the piston approaches the bottom end of the cylinder 650, the arm 688 makes contact to create the almost out signal 692 which causes the control valve 680 to redirect the exhaust gases from the initial path 682 through the second path 684 and the needle valve 686. This causes a cushioning of the cylinder as it reaches the end of its travel. In like fashion, if the control valve 672 directed the high pressure air supply through the conduit 676, then the piston 652 would be driven in an upward direction, causing exhaust gases to be emitted through the conduits 674, 678, and 682 to exhaust. However, as the piston nears its upward end of travel, the arm 688 makes contact to generate the almost in signal 694 which causes the control valve 680 to redirect the exhaust gases through the needle valve 686 again causing a cushioning effect to prevent damage to the piston and the air cylinder.

The reciprocating motion of the piston 652 causes an oscillating motion of the shaft 660 and 596, which in turn oscillate the arms 594 and 595. The oscillation of the arms 594 and 595 causes the transfer block 568 to be reciprocated between a position where the slots 572 and 574 are aligned with a channel member of the drum 569 so that a component carrier may be received by the transfer block, to a position where the transfer block moves the component carrier toward the front plate 552 to which is mounted the test contactor. After the component has been tested, the transfer block moves towards its inward position beneath the drum. Once the transfer block has moved away from the test contactor a predetermined distance and beyond a retainer plate 699, the tested component will drop into an output chute 700, FIG. 30, from which it will travel to an output container or sorting apparatus, as already described.

When the transfer block 568 is in its full "in" position, the transfer block is beneath the drum 560 to receive a new component and carrier, and the piston 652 is in a full up position so that the lateral arm 688 initiates a delay signal 696 which causes the transfer block to remain beneath the drum for a predetermined period of time. After the predetermined period of time, the piston is moved downwardly causing the transfer block to be moved toward the test contactor. When the piston has reached the bottom of the air cylinder, the transfer block is in its full "out" position; and a start test signal 690 is generated for the testing of the component. An "end of test" signal may be received from the test computer to activate the piston in an upward direction to complete one cycle of operation.

In addition to describing a handling system, the inventors have also described various devices or apparatus which are parts of the system and which are individually patentable. Obviously, many modifications and variations of the present inventions are possible in the light of the above teachings. It is therefore to be understood that within the scope of the appended claims the invention may be practiced otherwise than as specifically described.

We claim:

1. A handling device for component carriers comprising:
    a. a housing;
    b. a handling mechanism disposed within said housing including means comprising a vertical chute and a stop in fixed position in said chute for receiving carriers and positioning said carriers at a first level at an initial station, a horizontally reciprocating transporter in horizontal alignment with said initial station for moving said carriers horizontally from said stop to a second station at a second level wherein carriers are in position for making contact with a test contactor, said transporter being movable in the opposite horizontal direction away from said test contactor to a third station in vertical alignment with said initial station; and a quick releasable connector assembly on said housing having a passage therethrough for said carriers in vertical alignment with said chute, said assembly comprising a stationary part attached to the housing and a movable part, one of said parts having an elongated opening therein and a post on the other of the parts having a sliding engagement with said opening, a yieldable cam follower on the part which has the opening therein at a location overlying said opening, a cam surface on the post in a position for engagement with said cam follower, and complementary interlocking elements respectively on said cam follower and said post having a yieldable locked relationship when said movable part is in engagement with said stationary part.

2. A handling system for components in carriers comprising a housing, a test contactor associated with said housing,
    means associated with the housing for receiving and for orienting a plurality of component carriers;
    a handling mechanism disposed within said housing including means comprising a vertical chute and a stop in fixed position in said chute for receiving said carriers and for positioning said carriers at a first level at an initial station, a horizontally reciprocating transporter in horizontal alignment with said initial station for moving said carriers from said stop to a second station at a second level into a position in contact with said test contactor, said transporter being movable in the opposite horizontal direction to shift said component carrier out of contact with said test contactor.

3. A handling system for components in carriers as claimed in claim 2 wherein said receiving and orienting means comprises a vibratory container for receiving in batch a plurality of components, said container when in vibratory condition being adapted to orient said component carrier in a predetermined attitude and feed said component carriers serially to said handling mechanism.

4. A component carrier handling mechanism for bringing a carrier and component therein into contact with a test contactor comprising:
    a. a support;
    b. means connected to said support for receiving said carrier and positioning said carrier at a first level at an initial station; and
    c. a horizontally reciprocating transporter in horizontal alignment with said initial station connected to said support including means movable in one horizontal direction for effecting removal of said carrier from said first level to a second level at a second station lower than said first station, said transporter having a movable engagement with said carrier whereby to shift said carrier into positions respectively in contact with a test contactor and away from contact with said test contactor.

5. A mechanism as claimed in claim 4 including means connected to said support for positioning said carrier at said second level and for supporting said carrier at said second level.

6. A mechanism as claimed in claim 5 including cam means acting between said support and said carrier for biasing said carrier from said first level to said second level.

7. A mechanism as claimed in claim 5 wherein said transporter has oppositely disposed recesses for receiving said carrier said transporter having a slidable mounting on said support, said positioning and supporting means comprising a support member located adjacent said transporter during its travel to said test contactor, said support member extending between locations adjacent said test contactor and adjacent said receiving means.

8. A mechanism as claimed in claim 7 including a cam surface acting between said support and said carrier for biasing said carrier from said first level to said second level; a rod slidably connected to said transporter and cam means acting between said rod and said carrier for biasing said carrier against said test contactor.

9. A mechanism as claimed in claim 4 including
   a rod and cam assembly slidably connected to said transporter means for biasing said component against said test contactor.

10. A component carrier handling mechanism for bringing said component into contact with a test contactor comprising:

a. a support;
b. an input chute connected to said support;
c. a stop element for receiving said component from said input chute and for positioning said component at a first level;
d. a transporter slidably connected to said support for removing said component from said stop element, for moving said component into contact with a test contactor at a second level and for moving said component away from said test contactor;
e. a cam surface connected to said support for biasing said component from said first level to said second level;
f. a rod slidably connected to said transporter for biasing said component against said test contactor;
g. a support member connected to said support and located adjacent said transporter during its travel to and away from said test contactor, said support member supporting said component when at said second level; and
h. an output chute connected to said support and for receiving said component after said transporter has moved said component beyond an end of said support member.

* * * * *